(12) United States Patent
Ohta

(10) Patent No.: US 8,125,573 B2
(45) Date of Patent: Feb. 28, 2012

(54) INFORMATION PROCESSING APPARATUS AND METHOD, AND PROGRAM USED THEREWITH

(75) Inventor: Masatoshi Ohta, Tokyo (JP)

(73) Assignee: Sony Corporation (JP)

( * ) Notice: Subject to any disclaimer, the term of this patent is extended or adjusted under 35 U.S.C. 154(b) by 1404 days.

(21) Appl. No.: 11/698,259

(22) Filed: Jan. 25, 2007

(65) Prior Publication Data

US 2007/0188655 A1 Aug. 16, 2007

(30) Foreign Application Priority Data

Jan. 26, 2006 (JP) ................ P2006-017208

(51) Int. Cl.
*H04N 5/50* (2006.01)
*H04N 5/44* (2011.01)
*H04N 5/445* (2011.01)
*H04N 7/10* (2006.01)
*H04N 7/25* (2006.01)
*G06F 3/00* (2006.01)
*G06F 13/00* (2006.01)
*G06K 7/10* (2006.01)
*H03K 17/00* (2006.01)

(52) U.S. Cl. ........ 348/731; 348/734; 348/564; 348/569; 725/32; 725/38; 340/2.4

(58) Field of Classification Search .................... None
See application file for complete search history.

(56) References Cited

U.S. PATENT DOCUMENTS

| | | | |
|---|---|---|---|
| 5,682,207 A | 10/1997 | Takeda et al. | |
| 6,331,877 B1 * | 12/2001 | Bennington et al. | 348/731 |
| 7,013,477 B2 * | 3/2006 | Nakamura et al. | 725/32 |
| 2005/0114885 A1 | 5/2005 | Shikata et al. | |
| 2005/0223403 A1 * | 10/2005 | Suito et al. | 725/32 |
| 2009/0044220 A1 * | 2/2009 | D'hoore et al. | 725/38 |

FOREIGN PATENT DOCUMENTS

JP 06-311449 A 11/1994

(Continued)

OTHER PUBLICATIONS

Office Action from Japanese Application No. 2006-017208, dated Apr. 27, 2010.

(Continued)

*Primary Examiner* — Jefferey Harold
*Assistant Examiner* — Sean Haiem
(74) *Attorney, Agent, or Firm* — Lerner, David, Littenberg, Krumholz & Mentlik, LLP

(57) ABSTRACT

An information processing apparatus may include a channel list generating unit that performs primary selection of channels as primary candidate channels for switching candidate channels from channels in a predetermined order, secondary selection of channels as secondary candidate channels from the primary candidate channels, and generation of a channel list having pieces of specifying information arranged in the order which specify details transmitted on at least one channel, a display control unit that controls displaying the channel list, and a final candidate channel selecting unit that performs, in the case of performing a selecting operation for selecting a channel from the channel list, determination of the selected channel as a final candidate channel when the selected channel is one secondary candidate channel, and determination of a different secondary candidate channel included in the channel list as the final candidate channel when the selected channel is one secondary candidate channel.

7 Claims, 12 Drawing Sheets

FOREIGN PATENT DOCUMENTS

| | | |
|---|---|---|
| JP | 07-193756 A | 7/1995 |
| JP | 2000-101941 A | 4/2000 |
| JP | 2000209456 A | 7/2000 |
| JP | 2000-253325 A | 9/2000 |
| JP | 2001238145 A | 8/2001 |
| JP | 2002-051300 A | 2/2002 |
| JP | 2002077770 A | 3/2002 |
| JP | 2003-047031 A | 2/2003 |
| JP | 2003116073 A | 4/2003 |
| JP | 2005-159521 A | 6/2005 |
| JP | 2005277790 A | 10/2005 |
| WO | 200423800 A1 | 3/2004 |
| WO | 2005/064928 A1 | 7/2005 |

OTHER PUBLICATIONS

Office Action from Japanese Application No. 2006-017208, dated Jul. 13, 2010.

Office Action from Japanese Application No. 2006-017208, dated Sep. 9, 2010.

* cited by examiner

INFORMATION PROCESSING APPARATUS AND METHOD, AND PROGRAM USED THEREWITH

CROSS-REFERENCE TO RELATED APPLICATIONS

This application claims priority from Japanese Patent Application No. JP 2006-017208 filed in the Japanese Patent Office on Jan. 26, 2006, the entire content of which is incorporated herein by reference.

BACKGROUND OF THE INVENTION

1. Field of the Invention

The present invention relates to information processing apparatuses and methods, and programs used therewith, and in particular, to an information processing apparatus and method for assisting a user in efficient zapping in a limited time, and a program used therewith.

2. Description of the Related Art

In a case of the related art, a user who watches and listens to a broadcast program on a predetermined channel on a television receiver may perform so-called "zapping", that is, an operation for changing channels and confirming what type of program is broadcast on another channel, in a case such as when the broadcast program is interrupted and a commercial message starts. Technologies for assisting with zapping are disclosed in Japanese Unexamined Patent Application Publication Nos. 2000-101941, 2005-159521, and 2000-253325.

The number of broadcast programs the user can watch and listen to tends to increase. Accordingly, in a limited time such as a commercial message period, it is very difficult for the user to evenly switch desired broadcast programs among a large number of broadcast programs even if the user uses the technologies of the related art in Japanese Unexamined Patent Application Publication Nos. 2000-101941, 2005-159521, and 2000-253325. In other words, at present, it is difficult for the user to perform efficient zapping in a limited time even if the user uses the technologies of the related art in Japanese Unexamined Patent Application Publication Nos. 2000-101941, 2005-159521, and 2000-253325.

SUMMARY OF THE INVENTION

Accordingly, it is desirable to enable the user to perform efficient zapping in a limited time.

An information processing apparatus according to an embodiment of the present invention may select one or more switching candidate channels from a plurality of channels for a plurality of transmission sources that transmit programs. The information processing apparatus may include a channel list generating unit that performs primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, a display control unit that controls display of the channel list for a user, and a final candidate channel selecting unit that performs, in a case in which the user performs a selecting operation for selecting a channel from the channel list whose display is controlled by the display control unit, determination of the selected channel as a final candidate channel when the selected channel is one of the one or more secondary candidate channels, and determination of a different secondary candidate channel included in the channel list as the final candidate channel when the selected channel is not one of the one or more secondary candidate channels.

The plurality of transmission sources may further transmit commercial messages, respectively, and, in the second criterion, each channel on which the commercial message is being transmitted may be excluded from the one or more secondary candidate channels.

The information processing apparatus may further include a recommended program selecting unit that selects a recommended program to be recommended for the user from the plurality of programs with the plurality of programs being respectively transmitted from the plurality of transmission sources or with the plurality of programs scheduled to be respectively transmitted from the plurality of transmission sources. In the first criterion, a channel for one transmission source for transmitting the recommended program selected by the recommended program selecting unit may be included in the one or more primary candidate channels.

The channel list generating unit may further generate a cursor for indicating the final candidate channel. After the selecting operation is performed by the user, when the selected channel is one of the one or more secondary candidate channels, the final candidate channel selecting unit may determine, as a display position of the cursor, a position at a piece of specifying information of the selected channel is indicated, and, when the selected channel is not one of the one or more secondary candidate channels, the final candidate channel selecting unit may determine, as the display position of the cursor, a position at which a piece of specifying information of a different secondary candidate channel included in the channel list is indicated, and, by positioning the cursor generated by the channel list generating unit at the position of the cursor determined by the final candidate selecting unit on the channel list, the display control unit may further control display of the channel indicated by the cursor as the final candidate channel.

The selecting operation may designate, as the selected channel, a channel specified by a piece of specifying information corresponding to a position of the cursor next above or below a present position of the cursor. After the selecting operation is performed by the user, when the selected channel is one of the one or more secondary candidate channels, the final candidate channel selecting unit may determine, as the display position of the cursor, the position of the cursor next above or below the present position of the cursor, and, when the selected channel is not one of the one or more secondary candidate channels, the final candidate channel selecting unit may determine, as the display position of the cursor, the position at which a piece of specifying information of the different secondary candidate channel is indicated, the piece of specifying information being closest to the selected channel in an upward or downward direction on the channel list.

The information processing apparatus may further include a channel determining unit that, when the user performs a determining operation for switching a watching-listening channel for broadcast-program watching and listening by the user to the final candidate channel whose display is controlled by the display control unit, determines, as the watching-listening channel, the final candidate channel, which is indicated by a piece of specifying information indicated by the cursor at the time the determining operation is performed.

The information processing apparatus may further include a commercial message detecting unit that, for each of the plurality of channels, on which commercial messages are respectively transmitted from the plurality of transmission sources, detects whether or not the commercial message is being transmitted. When the user performs a start operation for starting the selecting operation in a state in which the channel for which the commercial message detecting unit detects that the commercial message is being transmitted is determined as the watching-listening channel, the display control unit may control starting of display of the channel list and the cursor for the user, and, after the start operation is performed, when no determining operation is performed and the commercial message detecting unit detects termination of transmission of the commercial message for the watching-listening channel at the time the start operation is performed, the display control unit may control termination of display of the channel list and the cursor for the user, and the channel determining unit may determine again, as the watching-listening channel, a channel set as the watching-listening channel at the time the start operation is operated.

An information processing method according to another embodiment of the present invention may select one or more switching candidate channels for broadcast-program watching and listening by a user from a plurality of channels for a plurality of transmission sources that transmit programs. The information processing method may include the steps of performing primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, controlling display of the channel list for the user, and performing, in a case in which the user performs a selecting operation for selecting a channel from the channel list, determination of the selected channel as a final candidate channel when the selected channel is one of the one or more secondary candidate channels, and determination of a different secondary candidate channel included on the channel list as the final candidate channel when the selected channel is not one of the one or more secondary candidate channels.

A first program according to another embodiment of the present invention corresponds to the above-described information processing method.

In the information processing apparatus and method, and program according to the embodiments of the present invention, switching candidate channels for broadcast-program watching and listening by a user may be selected from a plurality of channels for a plurality of transmission sources that transmit programs. Specifically, in accordance with a first criterion, one or more channels may be primarily selected as one or more primary candidate channels for the one or more switching candidate channels from the plurality of channels in a predetermined order, and, in accordance with a second criterion, one or more channels may be secondarily selected as one or more secondary candidate channels from the one or more primary candidate channels. A channel list having pieces of specifying information arranged in the predetermined order is generated and displayed for the user, the pieces of specifying information specifying details transmitted on one or more channels including at least the one or more secondary candidate channels among the one or more primary candidate channels. In a case in which the user performs a selecting operation for selecting a channel from the channel list whose display is controlled by the display control unit, the selected channel may be determined as a final candidate channel when the selected channel is one of the one or more secondary candidate channels, and a different secondary candidate channel included in the channel list may be determined as the final candidate channel when the selected channel is not one of the one or more secondary candidate channels.

As described above, according to an embodiment of the present invention, a user can be assisted in zapping. In particular, the user can perform efficient zapping in a limited time.

DETAILED DESCRIPTION

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

Figure 7:
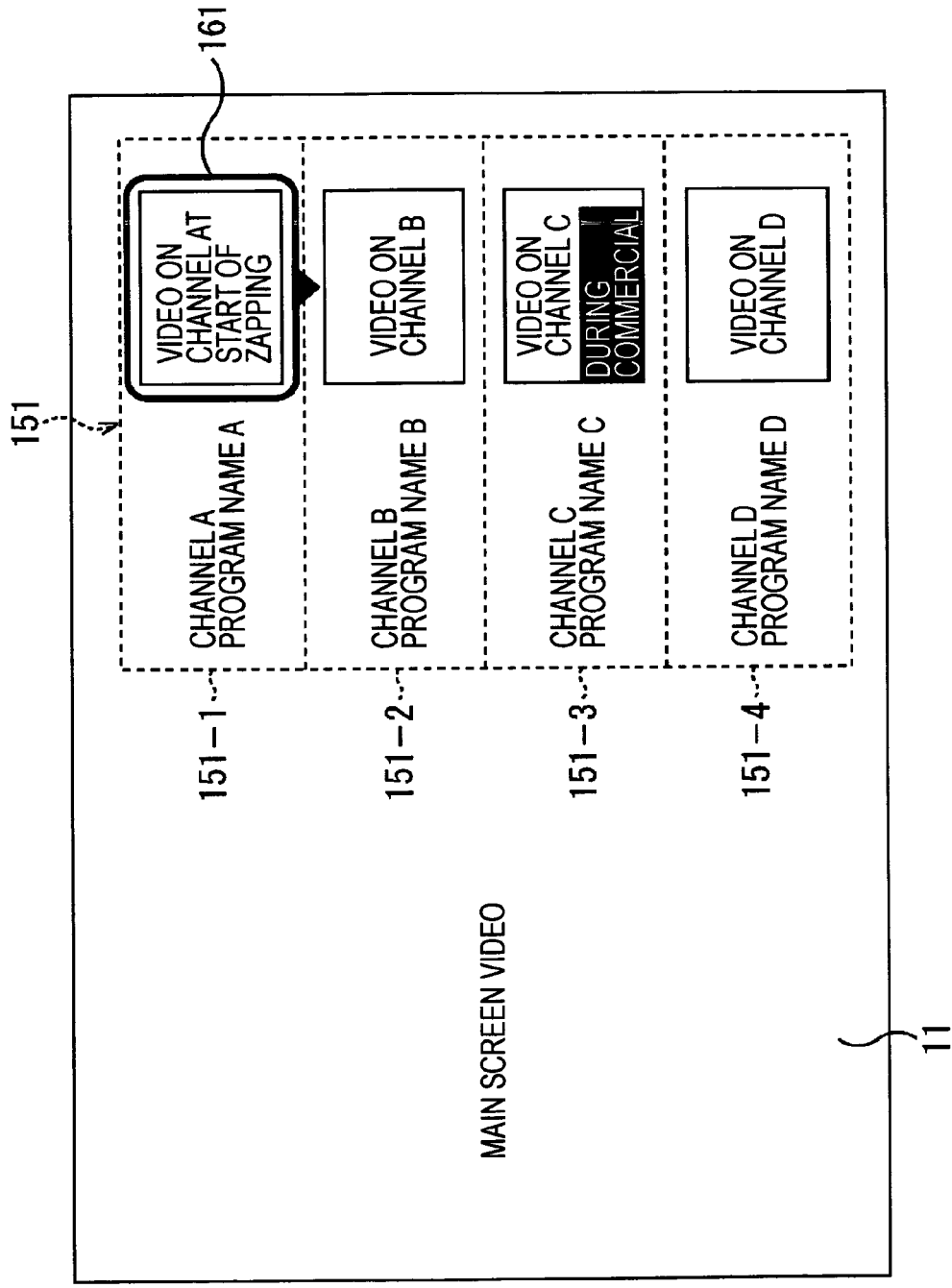
FIG. 7 is an illustration of a specific example of the result of the normal zapping mode process shown in FIGS. 5 and 6.
Figure 8:
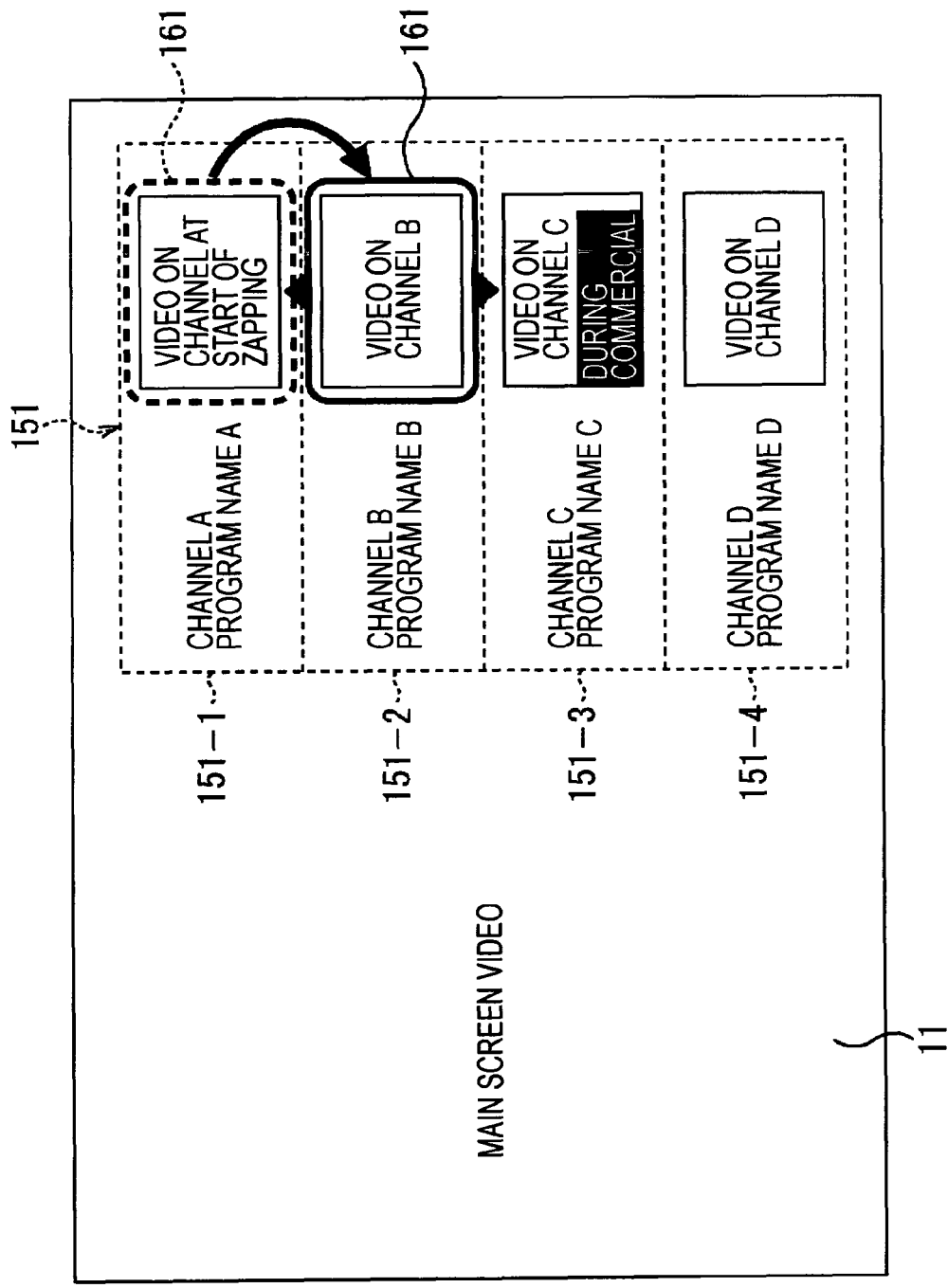
FIG. 8 is an illustration of a specific example of the result of the normal zapping mode process shown in FIGS. 5 and 6.
Figure 9:
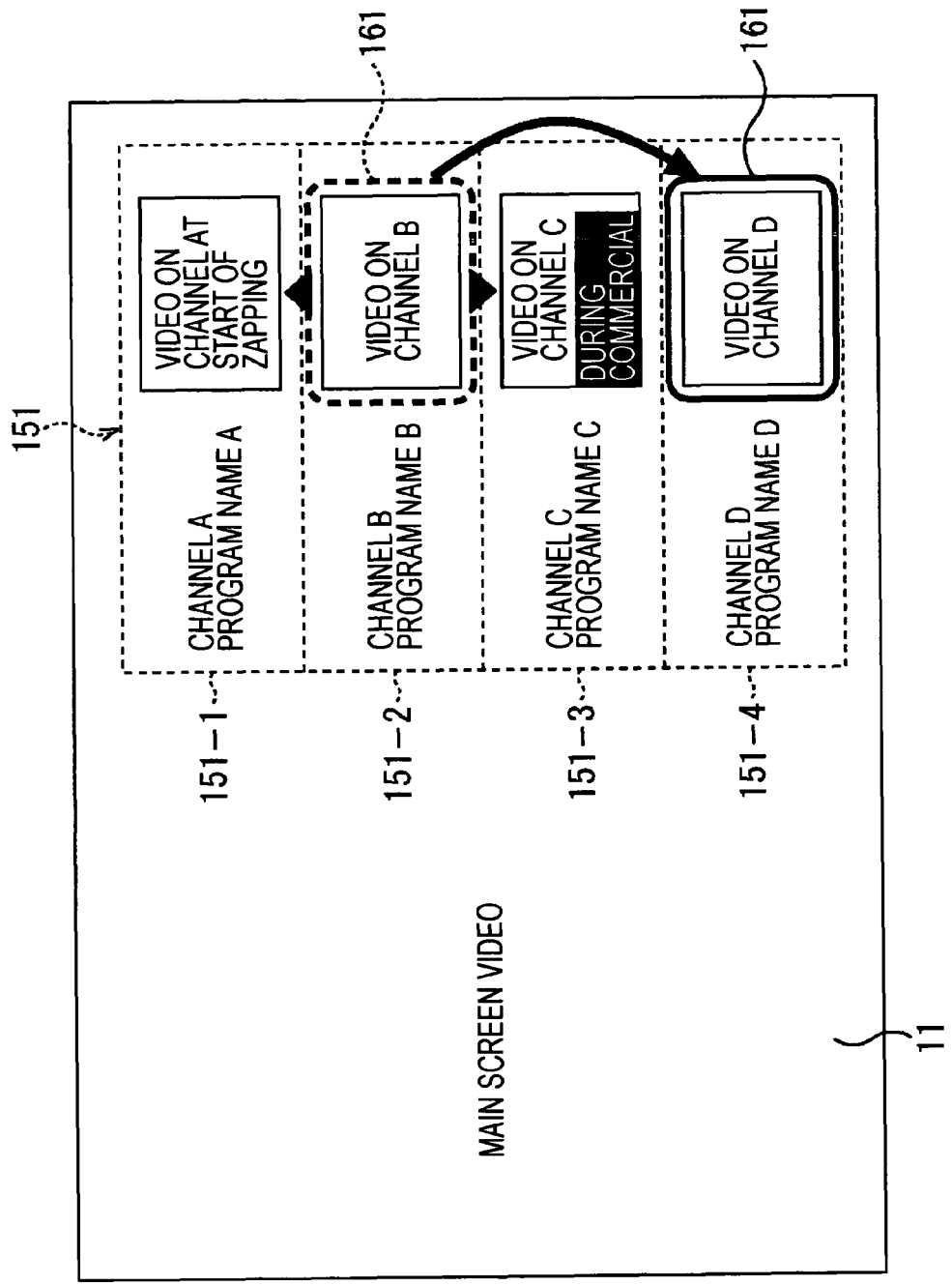
FIG. 9 is an illustration of a specific example of the result of the normal zapping mode process shown in FIGS. 5 and 6.

An information processing apparatus (for example, the television receiver 1 shown in FIG. 1 or the computer shown in FIG. 12 having the functional configuration shown in FIG. 3) according to an embodiment of the present invention includes a channel list generating unit (for example, the channel list generating unit 76 shown in FIG. 3) that performs primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list (for example, the channel list displayed in the part 151 shown in each of FIGS. 7 to 9) having pieces of specifying information (for example, pieces of specifying information displayed in the regions 151-1 to 151-4 shown in FIGS. 7 to 9) arranged in the predetermined order, the pieces of specifying information specifying details transmitted on one or more channels including at least the one or more secondary candidate channels among the one or more primary candidate channels, a display control unit (for example, the display control unit 75 shown in FIG. 3) that controls display of the channel list for a user, a final candidate channel selecting unit (for example, the final channel selecting unit 78 shown in FIG. 3) that performs, in a case in which the user performs a selecting operation for selecting a channel from the channel list whose display is controlled by the display control unit, determination of the selected channel as a final candidate channel when the selected channel is one of the one or more secondary candidate channels, and determination of a different secondary candidate channel included in the channel list as the final candidate channel when the selected channel is not one of the one or more secondary candidate channels.

Figure 3:
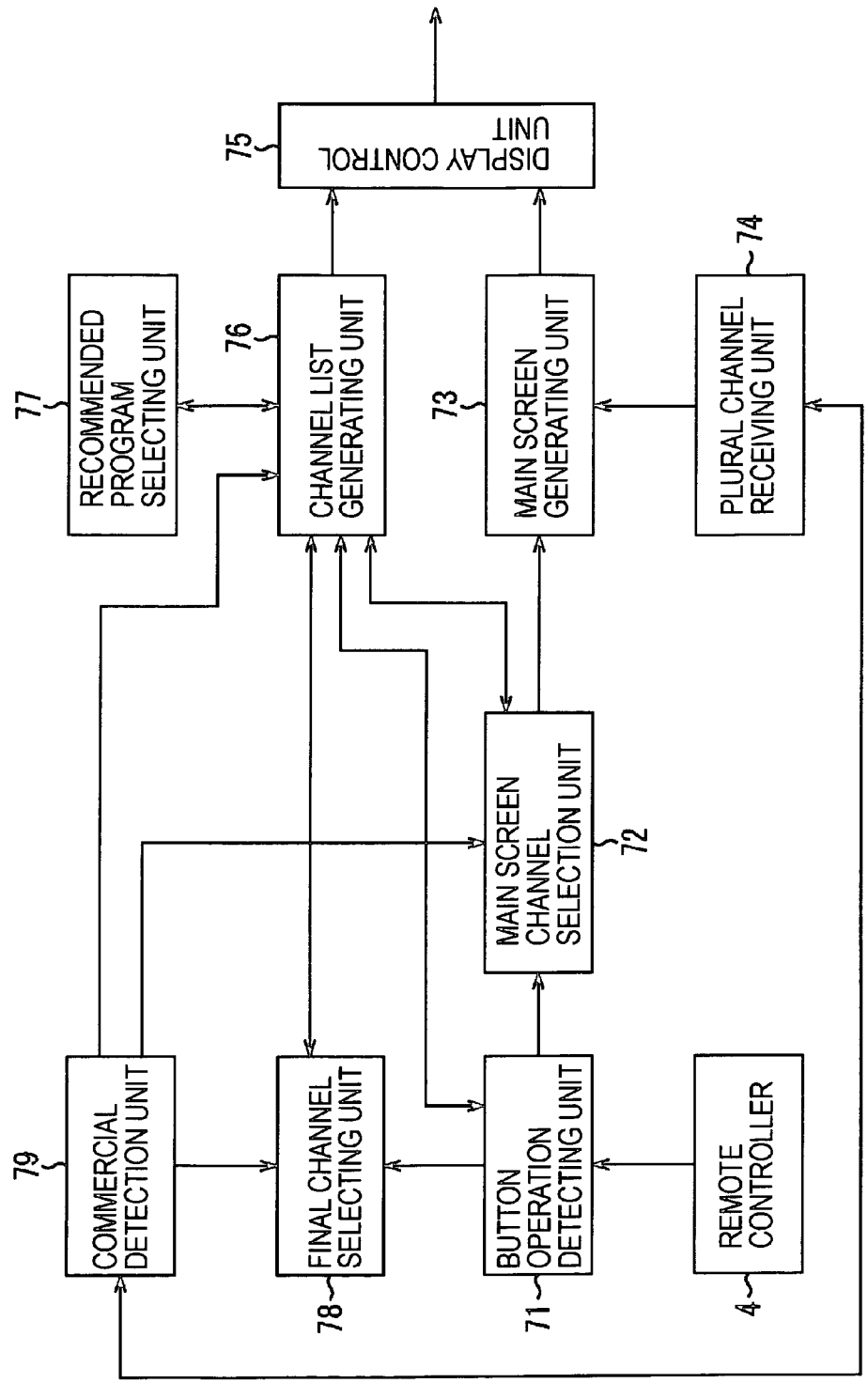
FIG. 3 is a functional block diagram showing an example of the configuration of, among the functions of the television receiver shown in FIG. 1, a function for realizing zapping mode processing.

The above information processing apparatus further includes a recommended program selecting unit (for example, the recommended program selecting unit 77 shown in FIG. 3) that selects a recommended program to be recommended for the user from the plurality of programs with the plurality of programs being respectively transmitted from the plurality of transmission sources or with the plurality of programs scheduled to be respectively transmitted from the plurality of transmission sources. In the first criterion, a channel for one transmission source for transmitting the recommended program selected by the recommended program selecting unit is included in the one or more primary candidate channels.

The channel list generating unit further generates a cursor (for example, the cursor 161 in each of FIGS. 7 to 9) for indicating the final candidate channel. After the selecting operation is performed by the user, when the selected channel is one of the one or more secondary candidate channels, the final candidate channel selecting unit determines, as a display position of the cursor, a position at a piece of specifying information of the selected channel is indicated, and, when the selected channel is not one of the one or more secondary candidate channels, the final candidate channel selecting unit determines, as the display position of the cursor, a position at which a piece of specifying information of a different secondary candidate channel included in the channel list is indicated. By positioning the cursor generated by the channel list generating unit at the position of the cursor determined by the final candidate selecting unit on the channel list, the display control unit further controls display of the channel indicated by the cursor as the final candidate channel.

Figure 2:
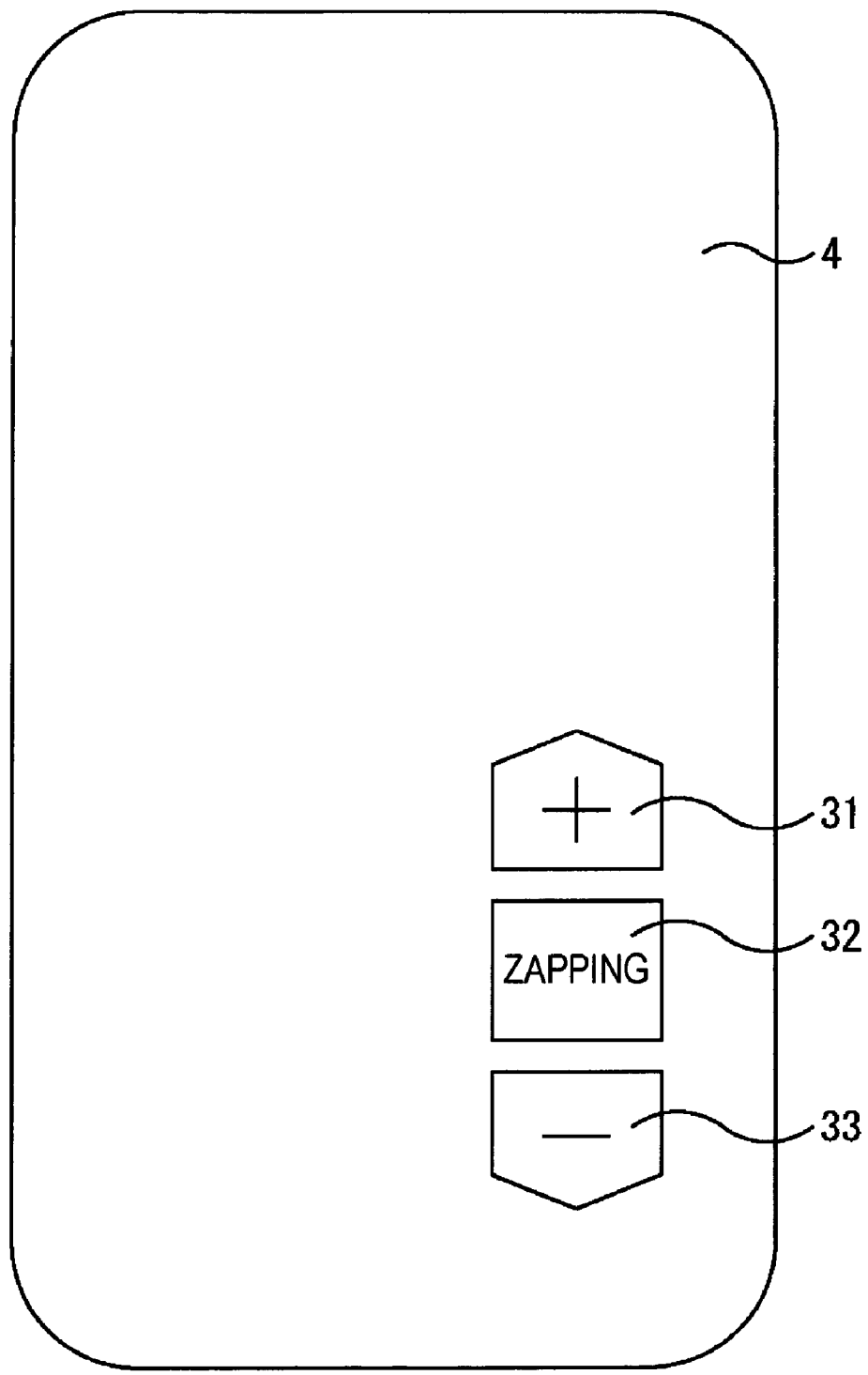
FIG. 2 is an exterior view of the remote controller shown in FIG. 1.

The selecting operation designates (for example, pressing the plus button 31 or minus button 33 shown in FIG. 2), as the selected channel, a channel specified by a piece of specifying information corresponding to a position of the cursor next above or below a present position of the cursor. After the selecting operation is performed by the user, when the selected channel is one of the one or more secondary candidate channels, the final candidate channel selecting unit determines, as the display position of the cursor, the position of the cursor next above or below the present position of the cursor (for example, when the minus button 33 is pressed in the state shown in FIG. 7, the display position of the cursor 161 is changed from the position of the sub-screen in the region 151-1 in FIG. 7 to the position of the sub-screen in the region 151-2 in FIG. 8), and, when the selected channel is not one of the one or more secondary candidate channels, the final candidate channel selecting unit determines, as the display position of the cursor, a position at which a piece of specifying information of the different secondary candidate channel, the piece of specifying information being closest to the selected channel in an upward or downward direction on the channel list, is indicated (for example, when the minus button 33 in FIG. 2 is pressed in the state shown in FIG. 8, the display position of the cursor 161 is changed from the position of the sub-screen in the region 151-2 in FIG. 8 to the position of the sub-screen in the region 151-4 in FIG. 9, jumping over the position of the sub-screen in the region 151-2 in FIG. 8).

The above information processing apparatus further includes a channel determining unit (for example, the main screen channel selecting unit 72 shown in FIG. 3) that, when the user performs a determining operation (for example, a re-press of the zapping button 32 in FIG. 2 after a zapping mode is started by pressing the zapping button 32) for switching a watching-listening channel (for example, the channel displayed in the main screen in each of FIGS. 7 to 9) for broadcast-program watching and listening by the user to the final candidate channel whose display is controlled by the display control unit, determines, as the watching-listening channel, the final candidate channel, which is indicated by a piece of specifying information indicated by the cursor at the time the determining operation is performed.

Figure 10:
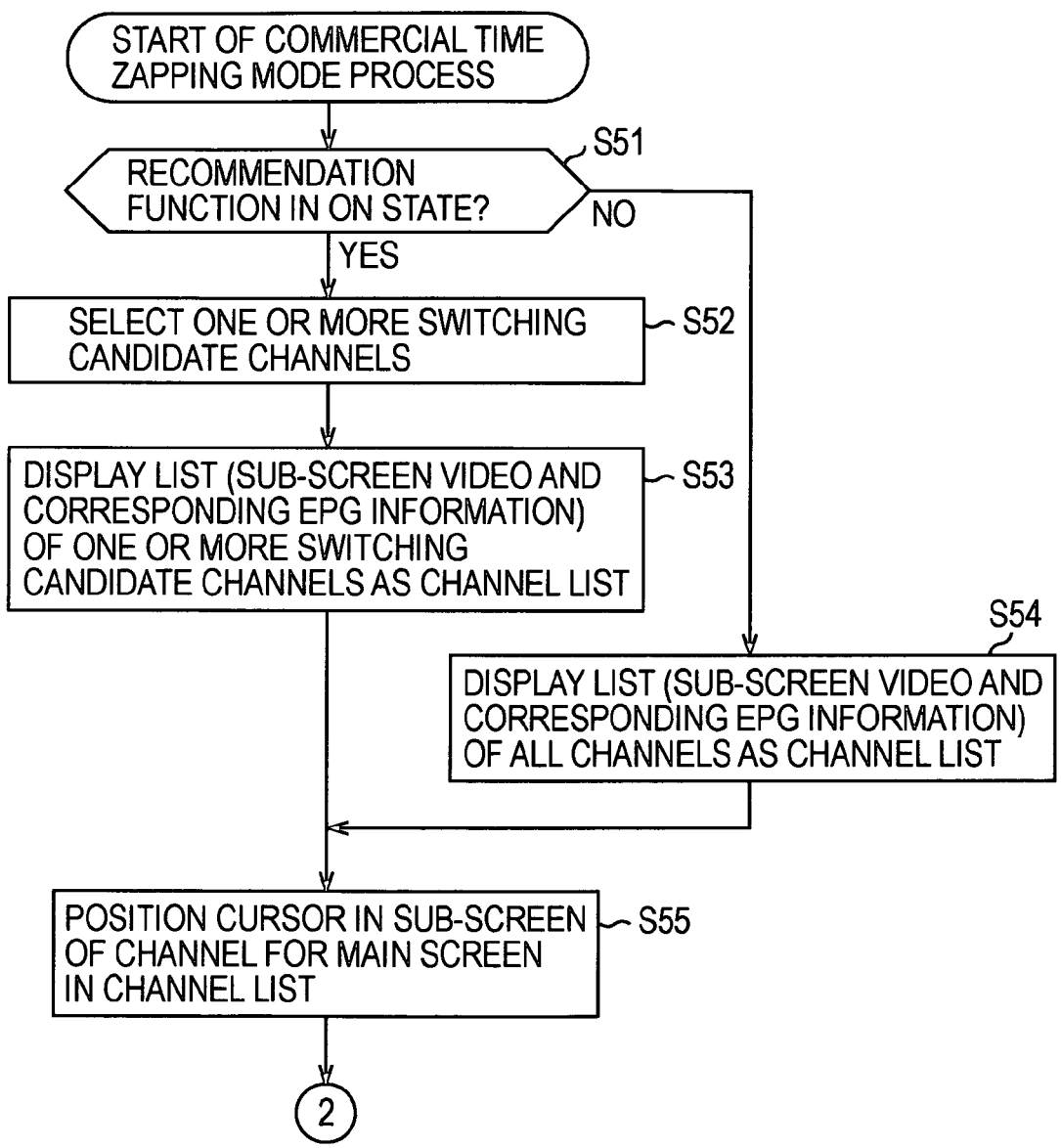
FIG. 10 is a flowchart illustrating a detailed example of the commercial-message-time zapping mode process in the zapping mode processing shown in FIG. 4.

The above information processing apparatus further includes a commercial message detecting unit (for example, the commercial detection unit 79 shown in FIG. 3) that, for each of the plurality of channels, on which commercial messages are respectively transmitted from the plurality of transmission sources, detects whether or not the commercial message is being transmitted. When the user performs a start operation for starting the selecting operation in a state in which the channel for which the commercial message detecting unit detects that the commercial message is being transmitted is determined as the watching-listening channel, the display control unit controls starting of display of the channel list and the cursor for the user, and, after the start operation is performed, when no determining operation is performed and the commercial message detecting unit detects termination of transmission of the commercial message for the watching-listening channel at the time the start operation is performed, the display control unit controls termination of display of the channel list and the cursor for the user, and the channel determining unit determines again (for example, the commercial-message-time zapping mode process shown in FIG. 10 is executed), as the watching-listening channel, a channel set as the watching-listening channel at the time the start operation is operated.

An information processing method (the zapping mode processing shown in FIG. 4) according to another embodiment of the present invention selects one or more switching candidate channels for broadcast-program watching and listening by a user from a plurality of channels for a plurality of transmission sources that transmit programs. The information processing method includes the steps of performing primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, controlling display of the channel list for the user (for example, steps S21 to S25 shown in FIG. 5, and steps S51 to S55 shown in FIG. 10), and performing, in a case (for example, if it is affirmatively determined in step S26 shown in FIG. 6, and, if it is affirmatively determined in step S56 shown in FIG. 11) in which the user performs a selecting operation for selecting a channel from the channel list, determination (for example, execution of step S30 in FIG. 6 or step S31 in FIG. 11) of the selected channel as a final candidate channel when the selected channel is one of the one or more secondary candidate channels (for example, if it is negatively determined in step S28 in FIG. 6, and, it is negatively determined in step S58 shown in FIG. 11), and determination (for example, repetition of loop processing in steps S28 and S29 in FIG. 6 before executing step S30, and repetition of loop processing in steps S28 and S29 in FIG. 11 before executing step S31) of a different secondary candidate channel included on the channel list as the final candidate channel when the selected channel is not one of the one or more secondary candidate channels (for example, if it is affirmatively determined in step S28 in FIG. 6, and, if it is affirmatively determined in step S58 in FIG. 11).

A program according to another embodiment of the present invention corresponds to the above information processing method according to the embodiment.

An embodiment of the present invention is described below with reference to the accompanying drawings.

Figure 1:
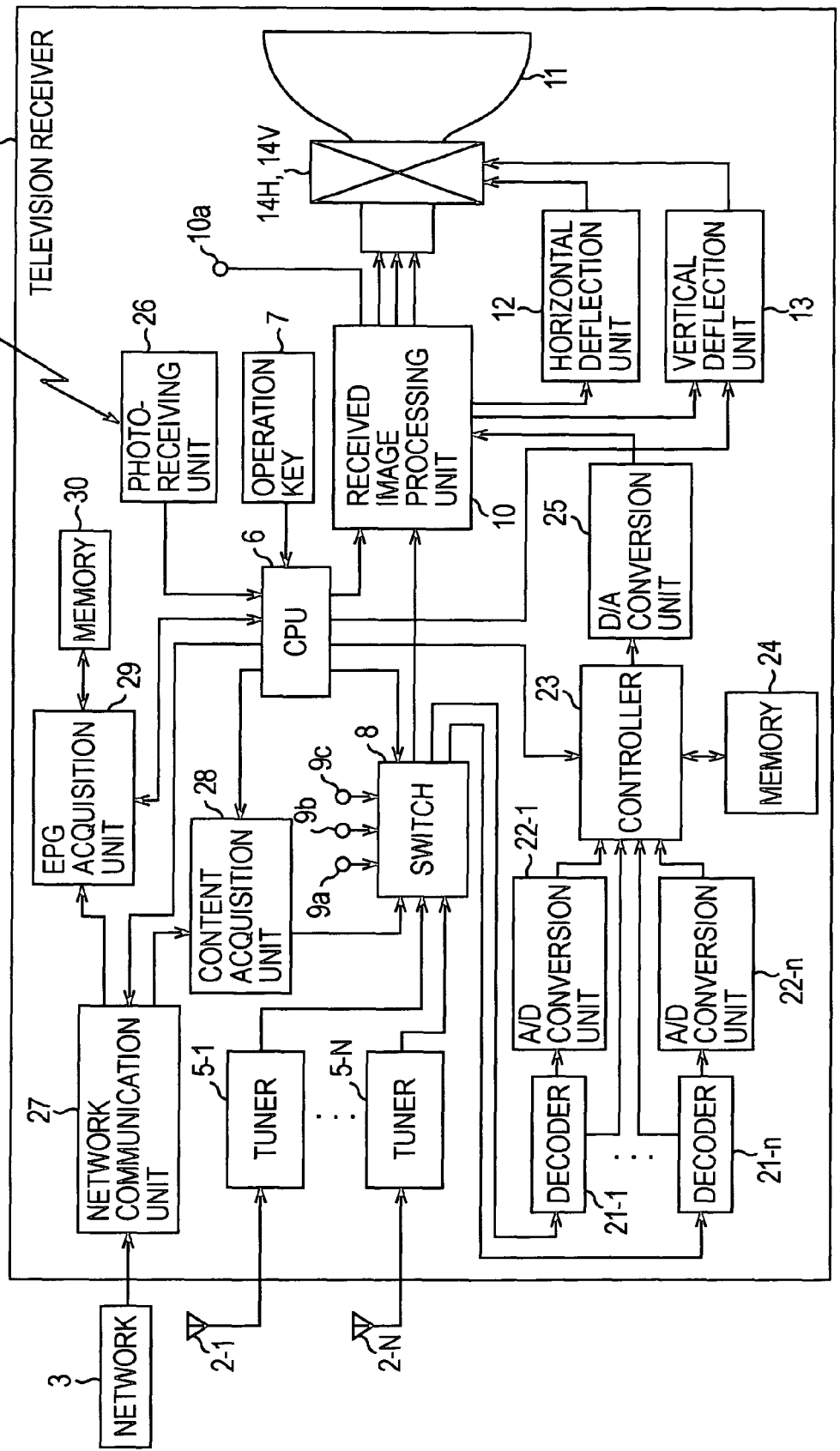
FIG. 1 is a block diagram showing an example of the configuration of a television receiver as an embodiment of an information processing apparatus to which an embodiment of the present invention is applied.

FIG. 1 shows an example of the configuration of a television receiver 1 as an information processing apparatus to which an embodiment of the present invention is applied.

In the example shown in FIG. 1, N (N represents an integer value equal to or greater than 2) antennas 2-1 to 2-N are connected to the television receiver 1. signals received by the antennas 2-1 to 2-N are respectively supplied to tuners 5-1 to 5-N.

The tuners 5-1 to 5-N respectively demodulate the signals received by the antennas 2-1 to 2-N, that is, broadcast waves in frequency bands on predetermined channels, and supply the resultant video signals to a switch 8.

Receive channels (channels uniquely allocated to broadcasting stations that broadcast programs as broadcast waves) of the tuners 5-1 to 5-N are controlled by a CPU (central processing unit) 6. Specifically, the CPU 6 is formed by, for example, a microcomputer, and controls various types of operations of the television receiver 1. The CPU 6 is supplied with operation signals that are output by an operation key 7 in response to user's operations, or control signals such as remote command signals that are received by a photo-receiving unit 26 after being output from a remote controller 4 in response to user's operations. On the basis of the control signals, the CPU 6 executes various types of processing for controlling receive channels and various operation modes. As a specific example of the processing, processing (zapping mode processing described later) for controlling a zapping mode is described with reference to FIG. 2 and the subsequent drawings.

As described above, the video signals are supplied from the tuners 5-1 to 5-N to the switch 8, respectively. In addition, a plurality of input terminals 9a, 9b, and 9c for external video signals are provided to the television receiver 1. Video signal sources, such as a VCR (videocassette recorder) and a video disc player, are connected to the input terminals 9a, 9b, and 9c. The video signals supplied from the video signal sources to the input terminals 9a, 9b, and 9c are input to the switch 8.

In the example shown in FIG. 1, the television receiver 1 has a function of connecting to a network 3 such as the Internet. To realize the connecting function, the television receiver 1 includes a network communication unit 27 for performing various types of communication processing. Accordingly, a broadcast program distributed in the form of content is supplied to a content acquisition unit 28 through the network communication unit 27 under the control of the CPU 6. Under the control of the CPU 6, the content acquisition unit 28 converts the content into a video signal, and supplies the video signal to the switch 8. Specifically, when, for example, content (MPEG stream data) encoded in an MPEG (Moving Picture Experts Group) format is distributed from the network 3, the content acquisition unit 28 sequentially performs MPEG decoding and D/A (digital to analog) conversion on the distributed content in the order given, and supplies the resultant video signal to the switch 8.

Under the control of the CPU 6, the switch 8 selects one predetermined video signal from among the video signals supplied as described above, and supplies the selected video signal to a received image processing unit 10. Under the control of the CPU 6, the received image processing unit 10 displays video corresponding to the video signal on a cathode-ray tube 11 by performing various types of receiving processing on the video signal from the switch 8, if necessary, and supplying the resultant video signals (RGB signals) to the cathode-ray tube 11.

In addition, in the example shown in FIG. 1, the received image processing unit 10 can output, from an output terminal 10a, a set of video signals identical to the video signals supplied to the cathode-ray tube 11. In this case, the video signals supplied to the cathode-ray tube 11 are RGB signals. However, the form of the set of video signals output from the output terminal 10a is not limited to RGB signals. When the set of video signals is output from the output terminal 10a in a form different from an RGB signal form, the received image processing unit 10 needs to have a function of generating video signals in such a form. Specifically, for example, when a composite video signal or a set of luminance/chroma separation video signals is output from the output terminal 10a, the received image processing unit 10 needs to have a function of creating a composite video signal or a set of luminance/chroma separation video signals from a video signal such as an RGB signal.

The received image processing unit 10 extracts a horizontal synchronizing signal and a vertical synchronizing signal from the video signal, and respectively supplies the extracted signals to a horizontal deflection unit 12 and a vertical deflection unit 13. Accordingly, a horizontal deflection unit 12 drives a horizontal deflection coil 14H provided in the cathode-ray tube 11, and a vertical deflection unit 13 drives a vertical deflection coil 14V provided in the cathode-ray tube 11.

In addition, the television receiver 1 in the example shown in FIG. 1 has the following function so as to (see FIGS. 7 to 9) simultaneously display a plurality of reduced images in different regions on a screen displayed on the cathode-ray tube 11. The entire screen displayed on the cathode-ray tube 11 is hereinafter referred to as the "main screen", and regions in which the reduced images are displayed are hereinafter referred to as "sub-screens".

Under the control of the CPU 6, the switch 8 selects n video signals (n represents an integer value equal to or greater than 1) from the supplied video signals (the outputs of the tuners 5-1 to 5-N, the outputs of the input terminals 9a, 9b, and 9c, and the output of the content acquisition unit 28). That is, the switch 8 selects n video signals for sub-screens and supplies the n video signals to decoders 21-1 to 21-n, respectively.

The decoders 21-1 to 21-n perform decoding processes on the supplied video signals, and supply the resultant luminance and chroma signals to A/D conversion units 22-1 to 22-n, respectively. The decoders 21-1 to 21-n also extract synchronizing signals from the supplied video signals, and supply the synchronizing signals to the controller 23.

The A/D conversion units 22-1 to 22-n perform A/D conversion processes on the supplied luminance and chroma signals, and supply the resultant digital video data items to the controller 23.

Under the control of the CPU 6, the controller 23 performs decimation on the video signals supplied from the A/D conversion units 22-1 to 22-n in accordance with a reduction factor of the displayed image. The controller 23 writes (stores) the resultant n video data items, that is, n video data items whose data sizes are reduced, as sub-screen video data items, in a memory 24. Writing of the sub-screen video data items into the memory 24 is consecutively executed in one-field periods based on the synchronizing signals from the decoders 21-1 to 21-n.

In addition, in the examples shown in FIGS. 7 to 9, on each sub-screen, on one side thereof, a channel name of video displayed on the sub-screen and a broadcast program name are together displayed, and a cursor 161 is also displayed surrounding the sub-screen. In the case of realizing the examples in FIGS. 7 to 9, under the control of the CPU 6, the controller 23 generates video data for displaying the channel name, the program name, the cursor 161, etc., if necessary, and stores the generated video data in the memory 24.

In this embodiment, the channel name and broadcast program name of video displayed on each sub-screen is supplied as EPG (electronic program guide) information from a different server (not shown) connected to the network 3. Accordingly, the television receiver 1 in FIG. 1 includes an EPG acquisition unit 29 and a memory 30. Specifically, under the control of the CPU 6, the EPG acquisition unit 29 acquires EPG information of each channel that is supplied, if necessary, through the network 3 and the network communication unit 27, and supplies the acquired EPG information in the memory 30.

In this specification, in addition to a channel uniquely allocated to each broadcasting station that broadcasts a program received by some of the antennas 2-1 to 2-N, to identify each distribution server or the like for distributing a broadcast program as content through the network 3, an identifier allocated to a particular distribution server or the like is also referred to as a "channel". In other words, in this specification, a program broadcast in a broadcast wave form from a broadcasting station and a broadcast program distributed in a content (stream data) form from a distribution server or the like on the network 3 are handled without being particularly distinguished. Accordingly, in this specification, terms that are used mainly for programs broadcast from broadcasting stations are used. One of the terms is, for example, the above-described "channel".

In addition, a method for acquiring the EPG information may be arbitrary without being limited to the above-described example. For example, the EPG acquisition unit 29 may extract EPG information in a vertical blanking period of a terrestrial television broadcast signal received by one of the tuners 5-1 to 5-N, and the EPG acquisition unit 29 may extract EPG information that is superposed as digital data on a satellite television broadcast signal received by one of the tuners 5-1 to 5-N. Both are not shown in FIG. 1.

In any of the above methods, EPG information of each channel is acquired by the EPG acquisition unit 29, and is stored in the memory 30. Thus, the CPU 6 can read the EPG information of the channel, if necessary, and can supply the read EPG information to the controller 23. The controller 23 generates video data corresponding to a channel name and broadcast program name of video displayed on each sub screen, and stores the video data in the memory 24.

As described above, the memory 24 stores video data for each sub-screen, video data of the channel name and broadcast program name of the sub-screen, video data of the cursor 161, etc. Accordingly, under the control of the CPU 6, the video data for the sub-screen, etc., stored in the memory 24 are consecutively read in one-field periods before being supplied to a D/A (digital-to-analog) conversion unit 25.

The D/A conversion unit 25 performs D/A conversion on the video data for the sub-screen, etc., that are supplied from the controller 23, and supplies the resultant analog luminance and chroma signals to the received image processing unit 10.

By performing receiving processing the luminance and chroma signals supplied from the D/A conversion unit 25, and supplying the resultant RGB signals to the cathode-ray tube 11, the received image processing unit 10 displays, on the cathode-ray tube 11, images corresponding to the digital data stored in the memory 24, that is, n sub-screen images and channel names and broadcast program names concerning the sub-screen images.

Accordingly, as shown in FIGS. 7 to 9, the cathode-ray tube 11 displays video (hereinafter referred to as "main screen video") corresponding to the video signal corresponding to the switch 8 on the main screen, and displays a list (channel list described later) of n sub-screen images, and channel names and broadcast program names concerning the sub-screen images in a predetermined partial region (the region 151 in the example in FIGS. 7 to 9) on the main screen.

Processing (hereinafter referred to as "zapping mode processing") by the television receiver 1 in a zapping mode is described below with reference to FIG. 2 and the subsequent drawings. The zapping mode is an operation mode for assisting a user in zapping.

FIG. 2 shows an example of the exterior of the remote controller 4. Although the remote controller 4 may be provided with various buttons such as numeral buttons, in the example shown in FIG. 2, these buttons are not shown, and only three buttons 31 to 33 for use when the user performs zapping are shown. In other words, in this embodiment, the user can perform zapping only by using the three buttons 31 to 33.

In accordance with FIG. 2, a button 31 is hereinafter referred to as a "plus button 31", a button 32 is hereinafter referred to as a "zapping button 32", and a button 33 is hereinafter referred to as a "minus button 33". Specifically, on the remote controller 4 shown in FIG. 2, the zapping button 32 is disposed between the plus button 31 and the zapping button 32. Channel changing functions are associated with the plus button 31 and the minus button 33. A function of instructing zapping to start or terminate is associated with the zapping button 32.

FIG. 3 is a functional block diagram showing an example of the configuration of, among the functions of the television receiver shown in FIG. 1, a function for realizing the zapping mode processing.

Specifically, the television receiver 1 includes, for example, a button operation detecting unit 71, a main screen channel selecting unit 72, a main screen generating unit 73, a plural channel receiving unit 74, a display control unit 75, a channel list generating unit 76, and a recommended program selecting unit 77. When the zapping mode processing is executed, the button operation detecting unit 71 to the recommended program selecting unit 77 are controlled to function. Details of each of the button operation detecting unit 71 to the recommended program selecting unit 77 are also described when a corresponding step is described among examples of the zapping mode processing described later with reference to FIGS. 4 to 11.

Figure 4:
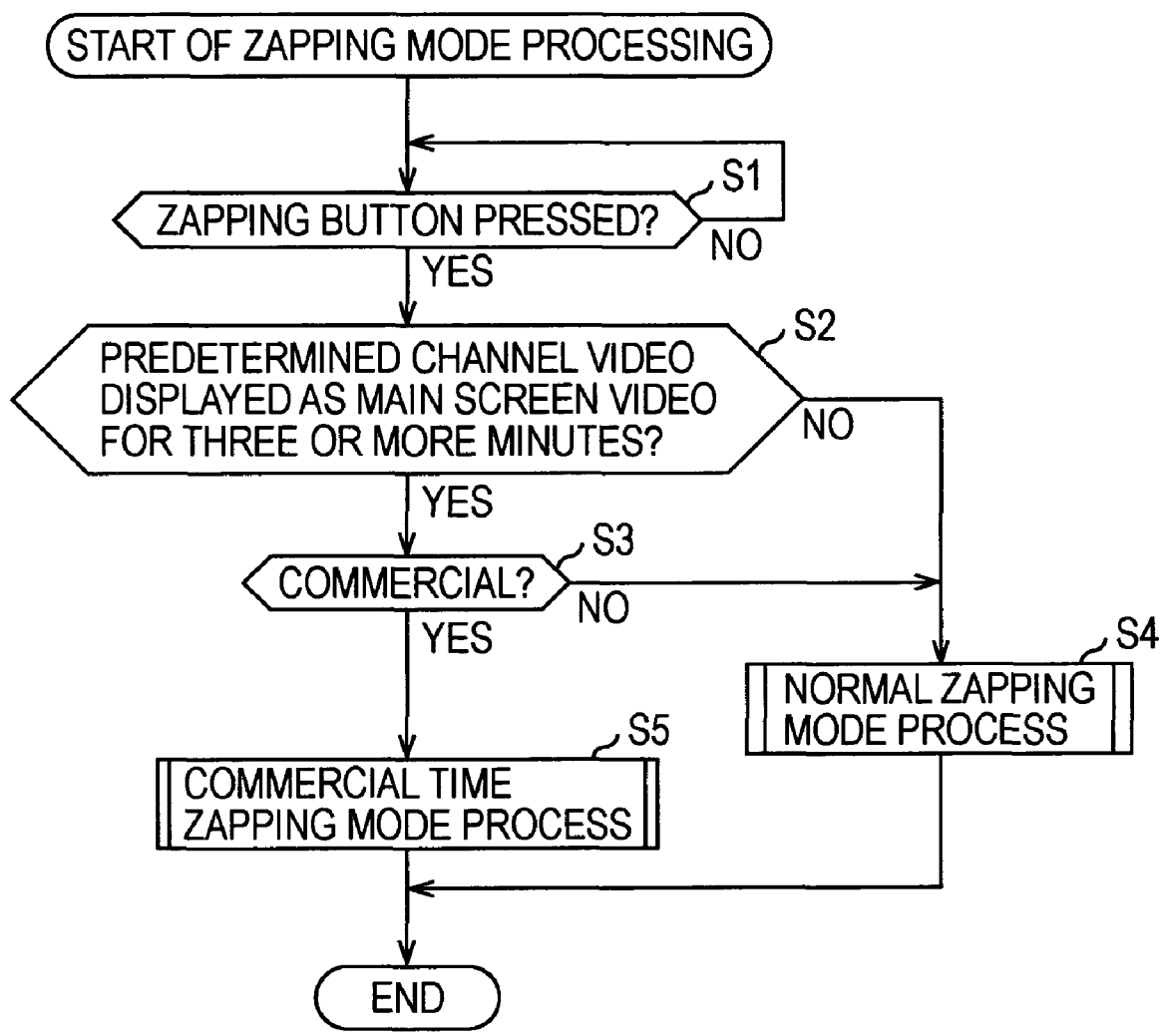
FIG. 4 is a flowchart illustrating zapping mode processing that is executed by the part of the television receiver shown in FIG. 3.

FIG. 4 is a flowchart illustrating an example of the zapping mode processing.

In step S1, the button operation detecting unit 71 shown in FIG. 3 determines whether the zapping button 32 FIG. 2) of the remote controller 4 has been pressed.

In other words, the button operation detecting unit 71 is configured by, for example, software or the like that is executed by the CPU 6 in the example in FIG. 1. The button operation detecting unit 71 detects which of the buttons (the plus button 31, the zapping button 32, and the minus button 33) of the remote controller 4 has been pressed.

Accordingly, the button operation detecting unit 71 negatively determines in step S1 until the zapping button 32 is pressed by the user. In this case, the process returns to step S1, and the button operation detecting unit 71 determines whether the zapping button 32 has been pressed again.

After that, when the button operation detecting unit 71 detects that the zapping button 32 has been pressed by the user, the button operation detecting unit 71 affirmatively determines in step S1, and the zapping mode is started. Then, a result indicating that the zapping button 32 has been pressed by the user is supplied from the button operation detecting unit 71 to the main screen channel selecting unit 72. Accordingly, the process proceeds to step S2. In other words, after the zapping mode is started, the following step S2 and subsequent steps are executed.

In step S2, the main screen channel selecting unit 72 determines whether video on a predetermined channel has continued to be displayed as main screen video for three or more minutes.

The main screen channel selecting unit 72 is configured by, for example, software or the like that is executed by, for example, the CPU 6 in FIG. 1. The main screen channel selecting unit 72 selects a channel (channel for the main screen) of video to be displayed as main screen video on the basis of the result of detection by the button operation detecting unit 71, and notifies the main screen generating unit 73 of the result of the selection.

The main screen generating unit 73 is configured as, for example, part of the switch 8 and received image processing unit 10 in FIG. 1. The plural channel receiving unit 74 is configured as, for example, the tuners 5-1 to 5-N and content acquisition unit 28 in FIG. 1. In this case, the main screen generating unit 73 generates a video signal for the main screen video by processing, if necessary, a video signal on the channel (channel for the main screen) selected by the main screen channel selecting unit 72 from the video signals on channels that are received by the plural channel receiving unit 74. The main screen generating unit 73 supplies the generated video signal to the display control unit 75.

The display control unit 75 is configured as, for example, part of the received image processing unit 10. The display control unit 75 displays, on the main screen, as the main screen video, video corresponding to the video signal supplied from the main screen generating unit 73.

Accordingly, the main screen channel selecting unit 72 knows, at any time, which channel is used for the main screen. In other words, the main screen channel selecting unit 72 manages a time during which video on a predetermined channel continues to be displayed as main screen video.

In this case, if the main screen channel selecting unit 72 has determined that the time during which the video on the predetermined channel has continued to be displayed as the main screen video is equal to or less than three minutes, the main screen channel selecting unit 72 negatively determines in step S2, and the process proceeds to step S4. In step S4, a normal zapping mode process is executed. Details of the normal zapping mode process are described later with reference to the flowcharts shown in FIGS. 5 and 6.

Conversely, if the main screen generating unit 73 has determined that the time during which the video on the predetermined channel has continued to be displayed as the main screen video is equal to or greater than three minutes, the main screen channel selecting unit 72 affirmatively determines in step S2, and the process proceeds to step S3.

In step S3, the main screen channel selecting unit 72 determines whether a commercial message is being displayed on the main screen, that is, whether the main screen video is commercial message video.

When the main screen video is video of a predetermined broadcast program, the main screen channel selecting unit 72 negatively determines in step S3, and the process proceeds to step S4. In step S4, the normal zapping mode process is executed. Details of the normal zapping mode process are described later with reference to the flowcharts in FIGS. 5 and 6.

Conversely, when the main screen video is commercial message video, the main screen channel selecting unit 72 affirmatively determines in step S3, and the process proceeds to step S5. In step S5, a commercial-message-time zapping mode process is executed. Details of the commercial-message-time zapping mode process are described later with reference to the flowcharts shown in FIGS. 10 and 11.

A technique of the determination in step S3 is not particularly limited. In this embodiment, when the commercial detection unit 79 in FIG. 3 detects that the main screen video is commercial message video, the result of determination in step S3 is affirmative. When the main screen video is not the commercial message video, the result of determination in step S3 is negative.

In this embodiment, the commercial detection unit 79 is configured by, for example, software or the like in the example in FIG. 1. The commercial detection unit 79 detects whether a commercial message is being transmitted on each channel. In other words, the commercial detection unit 79 detects whether pieces of video corresponding to the video signals on all the channels that are received by the plural channel receiving unit 74 are pieces of commercial message video. The result of detection by the commercial detection unit 79 is supplied not only to the main screen channel selecting unit 72, and but also too the channel list generating unit 76 and the final channel selecting unit 78, which are described later.

A technique of commercial message detection by the commercial detection unit 79 is not particularly limited. However, for example, the following technique can be used.

Although, for example, the above description mentions only the video signals, common broadcast programs include not only video but also audio, and, accordingly, the plural channel receiving unit 74 can receive not only the video signal on each channel but also an audio signal on the channel. In addition, in many cases, a commercial message audio mode is a stereo mode, and a broadcast program audio mode is a sound multiplex mode. Accordingly, the commercial detection unit 79 can detect a sound multiplex mode interval as a commercial-message-time interval. In other words, the commercial detection unit 79 can detect that video corresponding to the video signal received by the plural channel receiving unit 74 in the commercial-message-time interval is commercial message video. Details of the commercial message detecting technique is disclosed in, for example, Japanese Patent No. 2858758.

In addition, a volume level of commercial message sound has a feature in that the volume level is greater than a volume level of broadcast program sound. Accordingly, by analyzing an audio signal on a predetermined channel, the commercial detection unit 79 can detect, as a commercial message start point, a time at which a change (from small to large value) in volume of the audio signal reaches a predetermined amount or greater, and can subsequently detect, as a commercial message end point, a time at which a change (from large to small value) in volume of the audio signal reaches a predetermined amount or greater. In other words, the commercial detection unit 79 can detect, as a commercial time interval, an interval between the commercial message start point and the commercial message end point, and can detect, as commercial message video, video corresponding to a video signal received by the plural channel receiving unit 74 during the commercial time interval. Details of a technique of the commercial message detection are disclosed in, for example, Japanese Unexamined Patent Application Publication No. 2002-51300.

In addition, a commercial message has features in that, many cases, a commercial message time is a predetermined time (for example, 15 or 30 seconds in Japan), that the commercial message frequently tends to be consecutively broadcast, and that commercial messages are commonly connected by an anacoustic interval of several tens milliseconds and a cut (scene change). Accordingly, analyzing an audio signal on a predetermined channel to detect an anacoustic interval, analyzing an audio signal on a predetermined channel to detect a scene change, and combining the anacoustic interval and the scene change, the commercial detection unit 79 can detect a commercial message time interval. In other words, the commercial detection unit 79 can detect, as commercial message video, video corresponding to a video signal received in the commercial message time interval by the plural channel receiving unit 74. Details of a technique for commercial message detection are disclosed in, for example, Japanese Unexamined Patent Application Publication No. 2003-47031.

Next, step S4 in FIG. 4, that is, the normal zapping mode process, is described in detail with reference to the flowcharts shown in FIGS. 5 and 6.

As described above, when video on the same channel does not continue to be displayed as the main screen video for three or more minutes, or, in case in which, although video on the same channel continues to be displayed as the main screen video for three or more minutes, the video is not commercial message video (when the video is video of a broadcast program), that is, if, in step S2 or S3, the result of determination is negative, the result of determination is supplied from the main screen channel selecting unit 72 to the channel list generating unit 76, and the following normal zapping mode process is started.

Specifically, in step S21, the channel list generating unit 76 determines whether a recommendation function is in an ON state.

The recommendation function is a function for displaying a recommended program that should be recommended for the user. The recommended program is determined by the recommended program selecting unit 77. Specifically, the recommended program selecting unit 77 is configured by, for example, software that is executed by the CPU 6 in FIG. 1. On the basis of user's preference information, EPG information, etc., the recommended program selecting unit 77 determines whether a broadcast program being presently received or a broadcast program scheduled to be received is a recommended program. The recommended program selecting unit 77 notifies the channel list generating unit 76 of the recommended program.

Accordingly, in this embodiment, for example, it is assumed that, when the recommended program selecting unit 77 functions, in step S21, it is determined that the recommendation function is in the ON state. In this case, the process proceeds to step S22.

In step S22, the channel list generating unit 76 selects, as candidate channels (hereinafter referred to as "switching candidate channels") to be switched in zapping, a channel that is used for the main screen at the start of zapping (at the time the zapping mode is started by pressing the zapping button 32 in FIG. 2), and a channel through which the recommended program reported by the recommended program selecting unit 77 is presently being transmitted.

In step S23, the channel list generating unit 76 generates a list (hereinafter referred to as a "channel list") of pieces of specifying information for specifying contents of transmission on one or more switching candidate channels, and displays the channel list in a predetermined region on the screen of the cathode-ray tube 11 via the display control unit 75.

Specifically, for example, in this embodiment, as shown in FIG. 7, the channel list is displayed in a part 151 of the main screen of the cathode-ray tube 11.

Specifically, in the example in FIG. 7, four pieces of specifying information that specify transmission contents of four switching candidate channels are displayed in regions 151-1 to 151-4, respectively. In the example in FIG. 7, pieces of video of switching candidate channels displayed on sub-screens, and pieces of EPG information (in the EPG information, channel names and names of broadcast programs being transmitted) of the switching candidate channels are displayed as specifying information in order from the right in FIG. 7.

In this case, the arrangement order of the pieces of specifying information of the four switching candidate channels on the channel list is not particularly limited. However, the arrangement order is as follows. Specifically, in the top display region 151-1, a piece of specifying information for the channel used for the main screen at the start of zapping (the time the zapping mode is started by pressing the zapping button 32 in FIG. 2) is displayed. Below that, pieces of specifying information for three switching candidate channels through which recommended programs are being transmitted (including a channel through which a commercial message is being transmitted) are displayed in regions 151-2 to 151-4, respectively, in descending order of recommended program recommendation level.

In other words, in the arrangement order of the channel list, a piece of specifying information for a channel used for the main screen at the start of zapping is placed at the top. Subsequently, pieces of specifying information for switching candidate channels on which recommended programs are transmitted are sequentially placed in descending order of recommended program recommendation level. However, in the example in FIG. 7, pieces of specifying information for switching candidate channels having the fourth and subsequent recommendation levels are not initially displayed, and can be displayed when the channel list is scrolled. In the example in FIG. 7, a GUI (graphical user interface) for scrolling the channel list is not shown.

In this case, in this embodiment, for example, the recommendation level of each recommended program is determined by the recommended program selecting unit 77. Specifically, in this embodiment, the recommended program selecting unit 77 computes the recommendation levels of programs, and determines that each program whose recommendation level is equal to or greater than a threshold value is a recommended program. The recommended program selecting unit 77 reports each recommended program to the channel list generating unit 76 with its recommendation level. The channel list generating unit 76 generates the channel list by placing the pieces of specifying information for channels in descending order of recommendation level.

The channel list generating unit 76 is configured as, for example, part of the controller 23, memory 24, D/A conversion unit 25, and received image processing unit 10 shown in FIG. 1. In this case, the channel list generating unit 76 generates the channel list in the form of video data, and converts its form to a video signal before supplying the channel list to the display control unit 75. The display control unit 75 displays, as main screen video, video corresponding to the video signal supplied from the main screen generating unit 73. The display control unit 75 also displays, in predetermined part (the part 151 in FIG. 7) of the main screen, video corresponding to the video signal supplied from the channel list generating unit 76, that is, the channel list.

As described above, when the recommendation function is in the ON state, in step S21, it is affirmatively determined to execute steps S22 and S23, whereby a list (a list of pieces of specifying information including pieces of video on sub-screens for switching candidate channels and corresponding pieces of EPG information) of one or more switching candidate channels is displayed as the channel list.

Conversely, when the recommendation function is in an OFF state, in step S21, it is negatively determined to execute step S24. In other words, in step S24, the channel list generating unit 76 generates, as the channel list, a list of all the channels, that is, a list of pieces of specifying information including pieces of video on sub-screens of all the channels and corresponding pieces of EPG information, and uses the display control unit 75 to display the channel list in predetermined part of the screen of the cathode-ray tube 11.

In this case, the arrangement order, on the channel list, of pieces of specifying information for all the channels is not particularly limited. However, the arrangement order is as follows. Specifically, a piece of specifying information for the channel used for the main screen at the start of zapping is displayed in the top display region 151-1. Below that, pieces of specifying information for three channels are respectively displayed in regions 151-2 to 151-4 in ascending order of channel number.

That is, in the arrangement order of the channel list, the piece of specifying information for the channel used for the main screen at the start of zapping is placed at the top. Below that, the pieces of specifying information for the channels are sequentially placed in ascending order of channel number. However, when the total number of channels is equal to or greater than 5, pieces of specifying information for switching candidate channels, which have large channel numbers, are not initially displayed, and can be displayed when the channel list is scrolled.

As described above, after the channel list is displayed in step S23 or S24, the process proceeds to step S25.

In step S25, the channel list generating unit 76 positions (displays) a cursor in a sub-screen of the channel used for the main screen among the channels of the channel list.

Specifically, for example, in the example in FIG. 7, as the result of step S25, a cursor 161 is displayed surrounding the sub-screen in the top region 151-1, that is, the sub-screen displaying the "VIDEO ON CHANNEL AT START OF ZAPPING" in FIG. 7.

After step S25 ends, the end is reported from the channel list generating unit 76 to the button operation detecting unit 71. Accordingly, the process proceeds to step S26 in FIG. 6.

In step S26, the button operation detecting unit 71 determines whether the plus button 31 or minus button 33 of the remote controller 4 in FIG. 4 has been pressed.

In step S26, the button operation detecting unit 71 negatively determines unless the plus button 31 or the minus button 33 has been pressed. The process proceeds to step S31. Step S31 and the subsequent steps are described later.

Conversely, if the button operation detecting unit 71 detects that the plus button 31 or the minus button 33 has been pressed, the result of the detection is reported to the final channel selecting unit 78, and the process proceeds to step S27.

In step S27, the final channel selecting unit 78 sets, as a cursor-positioning candidate sub-screen, a sub-screen next above or below the present sub-screen on which the cursor is presently positioned (the sub-screen next above the present sub-screen is set when the plus button 31 is pressed, and the sub-screen next below the present sub-screen is set when the minus button 33 is pressed).

It is assumed that the present position (the sub-screen with the cursor presently positioned thereon) of the cursor is reported from the channel list generating unit 76 to the final channel selecting unit 78.

In step S28, on the basis of the result of the detection by the commercial detection unit 79, the final channel selecting unit 78 determines whether the video on the channel that is being displayed on the cursor-positioning candidate sub-screen is commercial message video.

If, in step S28, the video on the channel that is being displayed on the cursor-positioning candidate sub-screen is commercial message video in step S29, the final channel selecting unit 78 sets, as a cursor-positioning candidate sub-screen, a sub-screen further next above/below the present sub-screen. After that, the process returns to step S28, and the subsequent steps are repeatedly performed.

Conversely, if, in step S28, the final channel selecting unit 78 has determined that the video on the channel that is being displayed on the cursor-positioning candidate sub-screen is not the commercial message video, the final channel selecting unit 78 reports the cursor-positioning candidate sub-screen to the channel list generating unit 76. Accordingly, the process proceeds to step S30.

A channel through which the video is displayed on the cursor-positioning candidate sub-screen servers as a final switching candidate channel, as described later. In addition, the final channel selecting unit 78 is configured by software or the like that is executed by the CPU 6 in the example in FIG. 1.

In step S30, the channel list generating unit 76 positions (updates a cursor display position) the cursor on a cursor-positioning candidate sub-screen among the contents of the channel list.

After step S30 finishes, the channel list generating unit 76 reports the fact to the button operation detecting unit 71. After that, the process proceeds to step S31. In step S31, the button operation detecting unit 71 determines whether the zapping button 32 (FIG. 2) of the remote controller 4 has been pressed again.

The button operation detecting unit 71 negatively determines until the zapping button 32 is pressed by the user again. The process returns to step S26 and the subsequent steps are repeatedly performed.

Loop processing from step S26 to S31 is repeatedly performed until the zapping button 32 is pressed again by the user.

After that, if the button operation detecting unit 71 detects that the zapping button 32 has been pressed again by the user, in step S31, it is affirmatively determined. The result of the determination is reported from the button operation detecting unit 71 to the channel list generating unit 76. Accordingly, the process proceeds to step S32.

In step S32, the channel list generating unit 76 uses the display control unit 75 to erase the channel list. At the time the channel list is erased, a channel for video on a sub-screen with the cursor positioned thereon is supplied from the channel list generating unit 76 to the main screen channel selecting unit 72. In addition, the channel is supplied as a channel used for the main screen from the main screen channel selecting unit 72 to the main screen generating unit 73. Accordingly, the process proceeds to step S33.

In step S33, the main screen generating unit 73 uses the display control unit 75 to display, as a main screen, video on a channel displayed on the sub-screen with the cursor positioned thereon at the time the channel list is erased.

This finishes the normal zapping mode process. In other words, step S4 in FIG. 4 finishes, so that the entire zapping mode processing finishes.

Steps S26 to S33 are described below with reference to the specific examples shown in FIGS. 7 to 9.

Figure 5:
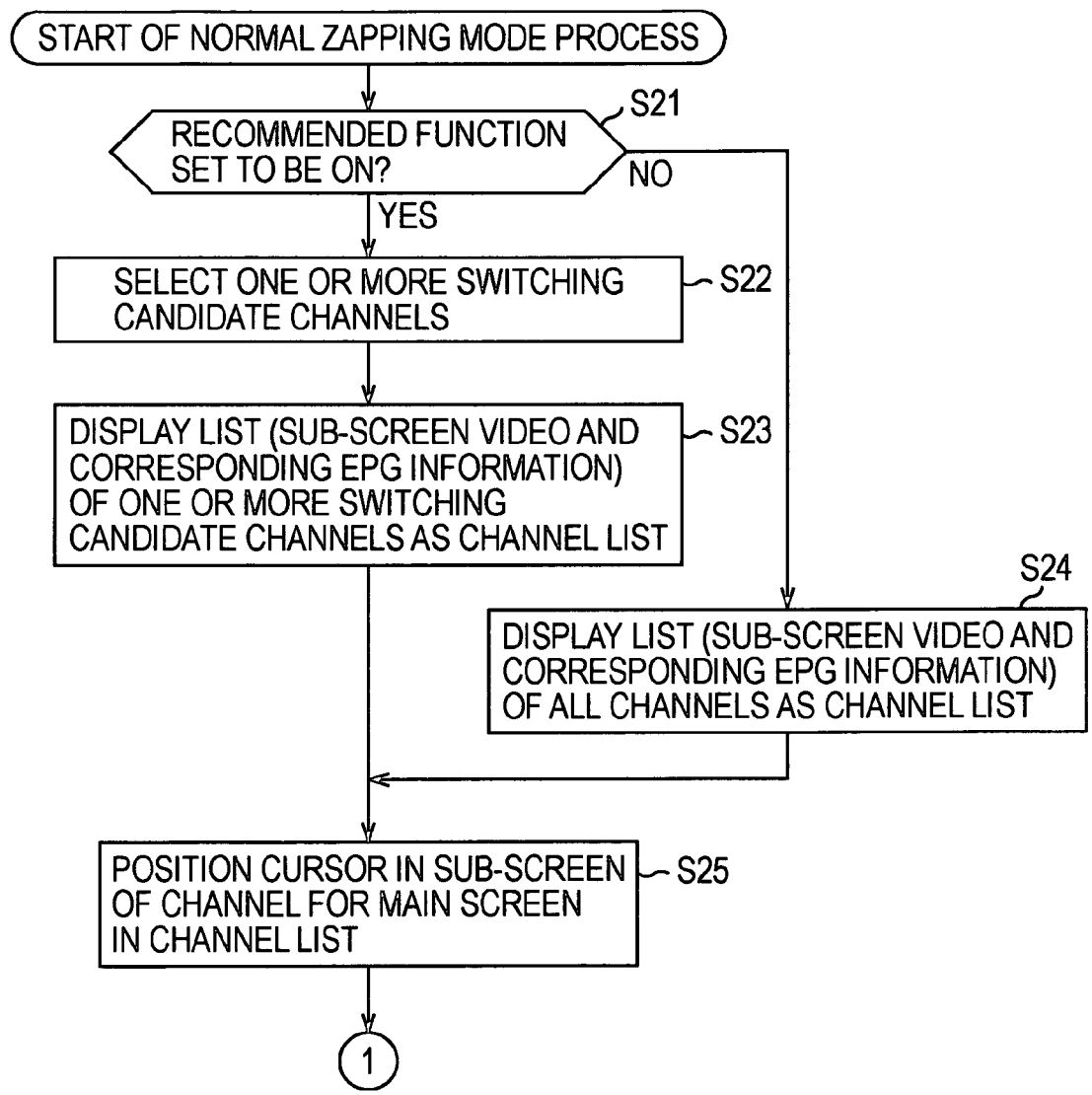
FIG. 5 is a flowchart illustrating a detailed example of a normal zapping mode process in the zapping mode processing shown in FIG. 4.

For example, it is assumed that a display state of the cathode-ray tube 11 at the end of step S25 in FIG. 5 is as shown in FIG. 7. Specifically, it is assumed that a channel list is displayed in part 151 of the screen of the cathode-ray tube 11, and it is assumed that a cursor 161 is positioned on a sub-screen (on which video on a channel at the start of zapping is displayed) of the top region 151-1. Also, it is assumed that video displayed on the sub-screen in the third region 151-3 from the top in the channel list displayed in the part 151 is commercial message video concerning channel C. That is, it is assumed that channel C is in transmitting the commercial message, with a representation (representing the fact) (the message "DURING COMMERCIAL" in the example in FIG. 7) displayed on the sub-screen.

When the minus button 33 of the remote controller 4 in FIG. 2 is pressed in the case of the above display state, it is affirmatively determined in step S26. In step S27, a sub-screen in a region 151-2 next below the region 151-1 with the cursor 161 presently positioned therein, that is, a sub-screen on which video on channel B is displayed is set as a cursor-positioning candidate sub-screen.

The channel for video being displayed on the sub-screen in the region 151-2, that is, channel B, is not in transmitting a commercial message. Thus, it is negatively determined in step S28. In step S30, as shown in FIG. 8, the cursor 161 is moved to the sub-screen in the region 151-2, that is, the sub-screen on which video on channel B is displayed.

After that, with no press of the zapping button 32 (FIG. 2), it is negatively determined, and the process returns to step S26.

When the minus button 33 of the remote controller 4 in FIG. 2 is pressed by the user again in the case of the display state shown in FIG. 8, it is affirmatively determined in step S26. In step S27, a sub-screen in region 151-3 next below the region 151-2 in which the cursor 161 is presently positioned, that is, a sub-screen with video on channel C displayed thereon, is set as a cursor-positioning candidate sub-screen.

In this case, the channel for the video being displayed on the sub-screen in the region 151-3, that is, channel C, is in transmitting a commercial message. Thus, it is affirmatively determined in step S28, and, in step S29, a sub-screen in a region 151-4 further next below the present sub-screen, that is, a sub-screen on which video on channel D is displayed, is set as a cursor-positioning candidate sub-screen.

After it is negatively determined in step S28, in step S30, as shown in FIG. 9, the cursor 161 is moved to the sub-screen in the region 151-4, that is, the sub-screen on which the video on channel D.

As described above, channel C that is in transmitting the commercial message is excluded from switching candidate channels. As a result, the switching candidate channel specified with the cursor 161 is switched from channel B (the channel for the video being displayed on the sub-screen in the region 151-2) to channel D (the channel for the video being displayed on the sub-screen in the region 151-4), jumping over channel C (the channel for the commercial message video being displayed on the sub-screen in the region 151-3).

From a user's viewpoint, by only pressing the plus button 31 or the minus button 33 of the remote controller 4, the switching candidate channels can be sequentially altered in the arrangement order of the channel list. In this case, the channel in transmitting the commercial message video is automatically excluded from the switching candidate channels.

In other words, in step S22 or S24, switching candidate channels are primarily selected, and pieces of specifying information concerning the primarily selected switching candidate channels are displayed as a channel list. After that, in step S28 or S29, the primarily selected switching candidate channels are secondarily selected, and the channel in transmitting the commercial message is excluded from the secondarily selected switching candidate channels. In other words, channels in transmitting not the commercial message but broadcast programs themselves serve as the secondarily selected switching candidate channels. In step S30, the final switching candidate channel is determined, and the cursor 161 is positioned on the sub-screen (on the channel specified by the piece of specifying information displayed in the region 151-4) of the final switching candidate channel.

When the zapping button 32 of the remote controller 4 in FIG. 2 is pressed by the user again in the case of the display state shown in FIG. 9, it is affirmatively determined in step S31. In step S32, the channel list displayed in the part 151 is erased. In step S33, the channel for the video displayed on the sub-screen in the region 151-4 with the cursor 161 positioned therein in the case of the display state shown in FIG. 9, that is, channel D, serves as the channel used for the main screen. As a result, the video on channel D becomes used as the main screen video.

As described above, by only pressing the plus button 31 or the minus button 33 of the remote controller 4, the user can change channels for zapping. In addition, in changing channels, the channel in transmitting the commercial message is automatically excluded. In other words, the channel in transmitting the commercial message can be automatically from switching candidate channels.

Next, step S4 in FIG. 4, that is, the commercial-message-time zapping mode process, is described in detail with reference to the flowcharts shown in FIGS. 10 and 11.

Figure 11:
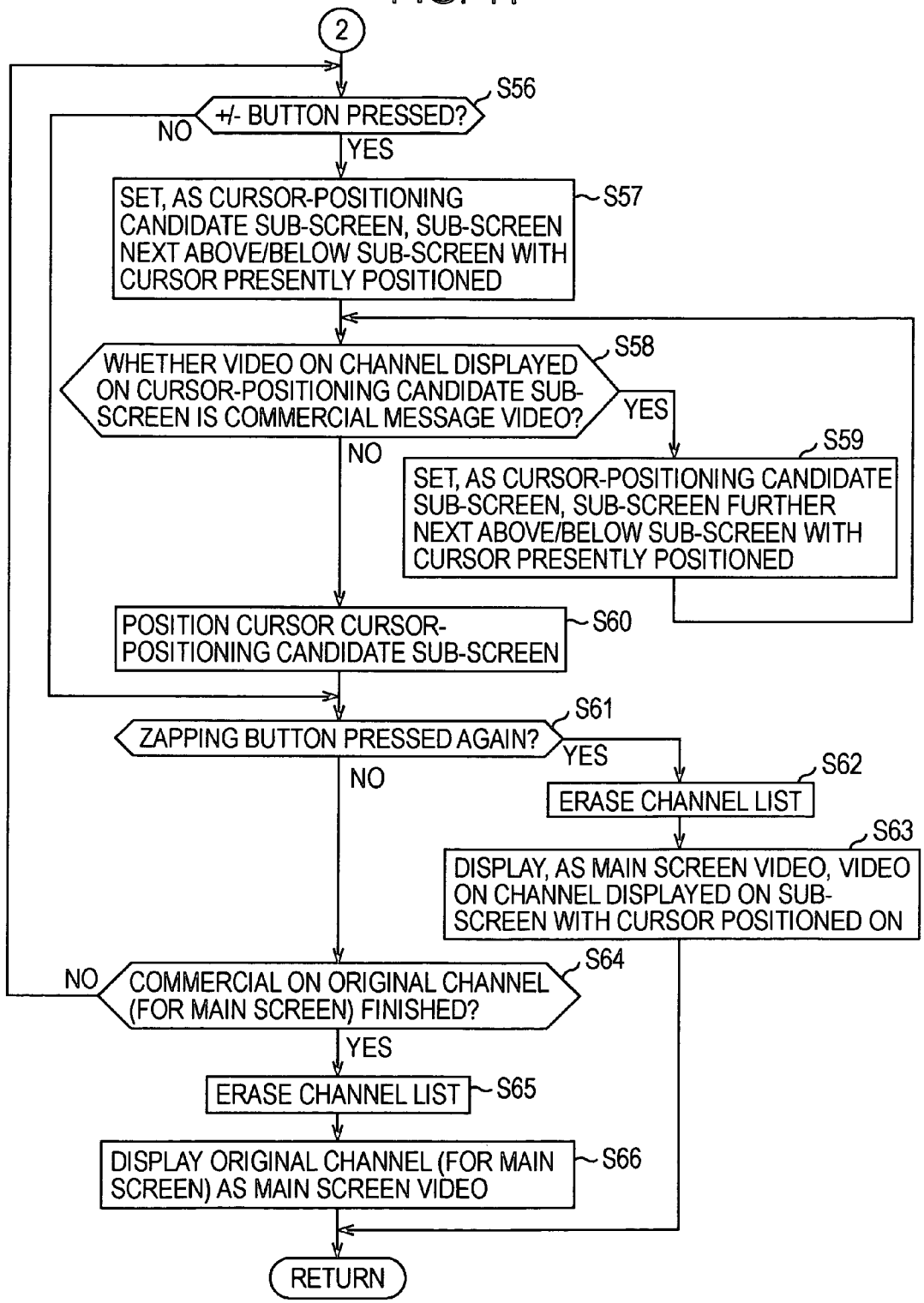
FIG. 11 is a flowchart illustrating a detailed example of the commercial-message-time zapping mode process in the zapping mode processing shown in FIG. 4.

As described above, when video on the same channel continues to be displayed for three or more minutes, and the video is presently commercial message video, that is, if it is affirmatively determined in step S3, the result of the determination is supplied from the main screen channel selecting unit 72 to the channel list generating unit 76, and the commercial-message-time zapping mode process shown in FIGS. 10 and 11 is started.

However, steps S51 to S55 shown in FIG. 10 are basically similar to steps S21 to S25 in FIG. 5. Steps S56 to S60 shown in FIG. 11 are similar to steps S26 to S30 in FIG. 6. In addition, steps S62 and S63 performed in a case (similar to a case in which it is affirmatively determined in step S31 in FIG. 6) in which it is affirmatively determined in step S61 are similar to steps S32 and S33 in FIG. 6. Accordingly, these steps are not described here.

Figure 6:
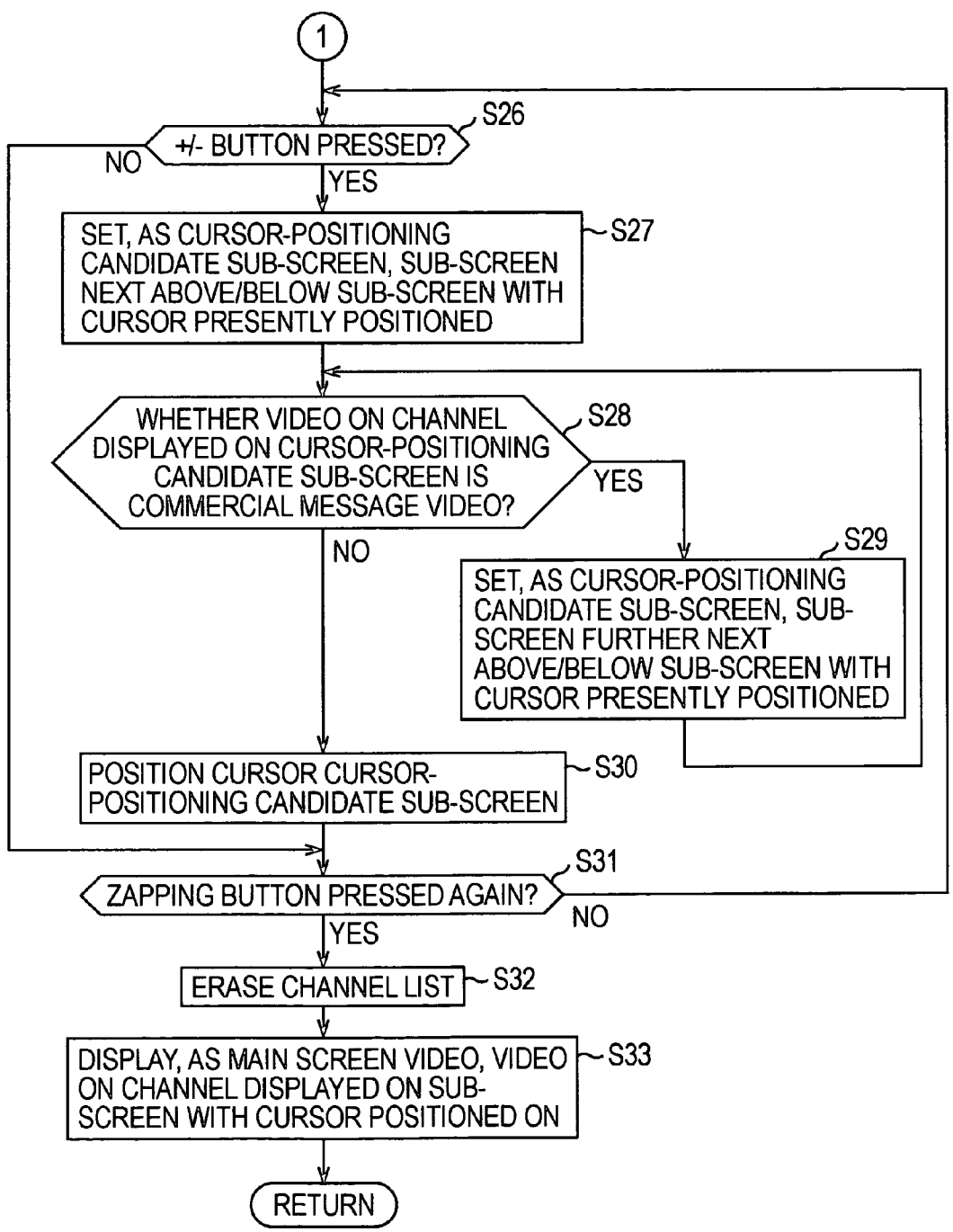
FIG. 6 is a flowchart illustrating a detailed example of the normal zapping mode process in the zapping mode processing shown in FIG. 4.

Conversely, if it is negatively determined in step S61, the commercial-message-time zapping mode process does not finish differently from a case in which it is negatively determined in step S31 in FIG. 6, and the following step S64 is executed.

Specifically, in step S64, on the basis of the result of the detection by the commercial detection unit 79, the channel list generating unit 76 determines whether commercial message video on the original channel (a channel used for the main screen even that time) used for the main screen has finished.

If, in step S64, the channel list generating unit 76 has determined that the commercial message video on the original channel (the channel used for the main screen even that time) used for the main screen has not finished, the process returns to step S56, and the subsequent steps are repeatedly performed.

In other words, the commercial-message-time zapping mode process is similar to the normal zapping mode process unless the commercial message video on the original channel (the channel used for the main screen even that time) used for the main screen finishes.

Specifically, in step S52 or S54, switching candidate channels are primarily selected, and pieces of specifying information concerning the primarily selected switching candidate channels are displayed as a channel list. After that, in steps S58 and S59, the primarily selected switching candidate channels are secondarily selected, and the channel in transmitting the commercial message is excluded from the secondarily selected switching candidate channels. In other words, channels in transmitting not the commercial message but broadcast programs themselves serve as the secondarily selected switching candidate channels. In step S60, a final switching candidate channel is determined, and a cursor is positioned on a sub-screen for the final switching candidate channel.

After that, when the commercial message on the original channel used for the main screen finishes, with the zapping button 32 not pressed again by the user, it is affirmatively determined in step S64, and the process proceeds to step S65.

In step S65, the channel list generating unit 76 uses the display control unit 75 to erase the channel list. The channel list generating unit 76 reports, to the main screen channel selecting unit 72, the fact that the channel list has been erased on the basis of termination of the commercial message. In this case, the main screen channel selecting unit 72 supplies the main screen generating unit 73 with returning (continuously maintaining the channel used for the main screen in this example) of the channel used for the main screen to the original channel. Accordingly, the process proceeds to step S66.

In step S66, the main screen generating unit 73 uses the display control unit 75 to display, as the main screen video, the video on the original channel used for the main screen (in this example, only the channel list is erased and video on the same channel continues to be displayed as the main screen video).

The above commercial-message-time zapping mode process is as described below from the user's viewpoint. When the user presses the zapping button 32 while a broadcast program that continues to be watched on the main screen for three or more minutes is providing a commercial message, the commercial-message-time zapping mode process can be executed.

In this case, similarly to the case of the normal zapping mode process, by only pressing the plus button 31 or the minus button 33 of the remote controller 4, the user can change channels for zapping unless the commercial message continues. In addition, in changing the channels, the channel in transmitting the commercial message is automatically jumped over. In other words, the channel in transmitting the commercial message can be automatically excluded.

After that, when a commercial message that is initially watched on the main screen finishes, the channel for the main screen is automatically switched to the original channel unless the user finishes the zapping mode by deliberately pressing the zapping button 32. Specifically, when the user deliberately presses the zapping button 32 before the commercial message finishes, the channel on the main screen is switched to a switching candidate channel at the time, that is, a channel for video on a sub-screen with the cursor 161 positioned thereon.

An example of the zapping mode processing by the television receiver 1 having the functional configuration in FIG. 3 has been described with reference to FIGS. 4 to 11.

Execution of the zapping mode processing by the television receiver 1 can produce the following advantages. Specifically, by only pressing the plus button 31 or minus button 33 in FIG. 2 of the remote controller 4 in order to perform zapping, the user can sequentially change channels, jumping over a channel in transmitting a commercial message. In other words, only channels in which the user is interested can be efficiently followed.

One of major purposes is to confirm what type of program is broadcast or distributed on a different channel. For the user, channels in transmitting commercial messages are inappropriate as items subject to zapping. However, in the above-described technologies of the related art in Japanese Patent Nos. 2000-101941, 2005-159521, and 2000-253325, it is difficult to perform efficient zapping because channels in transmitting commercial messages are handled as channels to be zapped. Conversely, execution of the above-described zapping mode processing can automatically exclude a channel in transmitting a commercial message, so that efficient zapping can be performed.

Furthermore, when the user performs zapping during the commercial message on the channel that is watched on the main screen, execution of the above-described zapping mode processing can automatically return the present channel to the original channel at the time the commercial message finishes (the main screen video returns video on the original channel).

The zapping mode processing that can produce the above advantages is not particularly limited to the above-described examples.

For example, in the above-described examples, the channel used for the main screen, at the time of selecting switching candidate channels, that is, at the time of altering the position of the cursor 161 on the basis of a user press on the plus button 31 or minus button 33 in FIG. 4, remains unchanged to be the original channel at the start of the zapping mode. Conversely, whenever switching candidate channels are updated, that is, whenever the position of the cursor 161 is updated, a switching candidate channel (a channel for video on a sub-screen with the cursor 161 positioned thereon) may be switched as the channel used for the main screen.

In each of steps S64 and S66 in FIG. 11, the term "ORIGINAL" has been inserted as it appears in the phrase "ORIGINAL CHANNEL (FOR MAIN SCREEN)" in order to cope with the above case.

Furthermore, in this case, in the commercial-message-time zapping mode process, when the commercial message on the channel (a channel whose video is originally the main screen video) used for the main screen at the start of the zapping mode finishes, instead of automatically switching to the original channel in the above example (step S66 in FIG. 11), a message (dialog) that urges the user to return to the original channel may be displayed.

In addition, in the above-described examples, a channel (its specifying information) in transmitting a commercial message is included in the channel list. However, as described above, during zapping, it is difficult to switch to the channel in transmitting a commercial message. That is, the channel in transmitting the commercial message is excluded from cursor-switching candidate sub-screens (switching candidate channels). Thus, the channel list may be generated and displayed so as not to include the channel in transmitting the commercial message (its specifying information).

The arrangement order of switching candidate channels (their pieces of specifying information) on the channel list is an order of broadcast program recommendation level in the above-described examples. However, the arrangement order is not limited to such an order, but may be an order in accordance with an arbitrary criterion. In addition, a criterion for selecting a channel to be excluded from switching candidate channels is a channel in transmitting a commercial message in the above-described examples. However, the criterion for selecting a channel to be excluded is not limited thereto, but an arbitrary selection criterion may be employed.

In other words, the information processing apparatus to which an embodiment of the present invention is applied is satisfied by an information processing apparatus having the following functions, and its configuration is not limited to the above-described example of the configuration.

In other words, an information processing apparatus to which an embodiment of the present invention is applied is an information processing apparatus for selecting one or more switching candidate channels from a plurality of channels for a plurality of transmission sources that transmit broadcast programs, the information processing apparatus including a channel list generating unit that performs primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, a display control unit that controls display of the channel list for a user, and a final candidate channel selecting unit that performs, in a case in which the user performs a selecting operation for selecting a channel from the channel list whose display is controlled by the display control unit, determination of the selected channel as a final candidate channel when the selected channel is one of the one or more secondary candidate channels, and determination of a different secondary candidate channel included in the channel list as the final candidate channel when the selected channel is not one of the one or more secondary candidate channels.

It is the above-described example that, inclusion of a channel for transmitting the recommended program in the primary candidate channels is employed as the first criterion, and exclusion of a channel in transmitting the commercial message from the secondary candidate channels is employed as the second criterion.

Therefore, the configuration of the information processing apparatus to which the embodiment of the present invention is applied is not limited to that shown in FIG. 1, but can be satisfied by an information processing apparatus configuration capable of being provided with the above functions. For example, the configuration of the information processing apparatus can be formed by, for example, the computer shown in FIG. 12.

Figure 12:
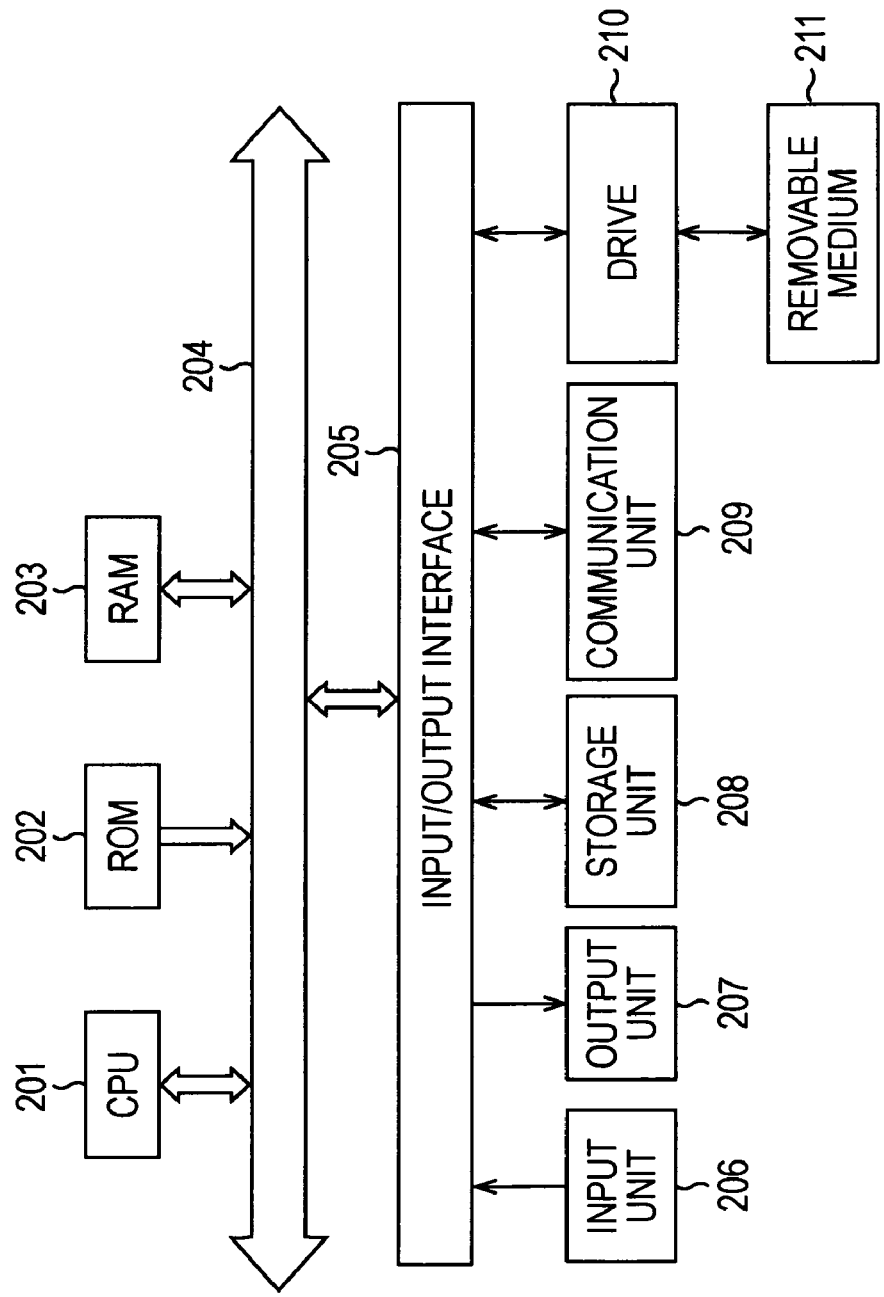
FIG. 12 is a block diagram showing an example of the configuration of a computer as another embodiment of the information processing apparatus to which the embodiment of the present invention is applied.

Referring to FIG. 12, a CPU (central processing unit) 210 executes various types of processing in accordance with a program recorded in a ROM (read-only memory) 202 or a program loaded from a storage unit 208 into a RAM (random access memory) 203. The RAM 203 also stores data, etc, that are necessary for the CPU 201 to execute various types of processing, if necessary.

The CPU 201, the ROM 202, and the RAM 203 are connected to one another by a bus 204. The bus 204 connects to an input/output interface 205.

The input/output interface 205 connects to an input unit 206 including a keyboard and a mouse, an output unit 207 including a display, the storage unit 208, which includes a hard disk, and a communication unit 209 including a modem and a terminal adapter. The communication unit 209 controls communication with a different apparatus (not shown) via networks including the Internet.

The input/output interface 205 connects to a drive 210, if necessary. The input/output interface 205 also connects to a removable medium 211 such as a magnetic disk, an optical disc, a magneto-optical disc, or a semiconductor memory, if necessary. A computer program that is read from the removable medium 211 is installed in the storage unit 208, if necessary.

In the case of executing consecutive processing by software, a program that forms the software is installed from a network or a recording medium into a computer built into dedicated hardware, or, for example, a multipurpose personal computer that can execute various functions by installing various programs.

As shown in FIG. 12, recoding media that include the above program include not only the removable medium 211 (package medium), which is separately distributed from the apparatus in order to provide the user with the program, and which includes a program-recorded magnetic disk (including a floppy disk), optical disc (including a CD-ROM (compact-disc read-only memory) or DVD (digital versatile disc)), magneto-optical disc (including an MD (Mini-Disc)) or semiconductor memory, but also the ROM 202, in which the program is recorded, and a hard disk included in the storage unit 208, the ROM 202 and storage unit 208 being provided to the user with both built into the apparatus beforehand.

Alternatively, as shown in FIG. 1, a program-included recording medium of the above type may be formed by a ROM (not shown) in the CPU 6, the memory 30, the memory 24, etc., in which programs are recorded, and which are provided to the user with them built into the apparatus beforehand.

In this specification, the steps that constitute a program recorded on a recording medium definitely include processing steps that are executed in order given in a time-series manner, and include processing steps that are executed in parallel or separately if they may not be executed in a time-series manner.

In addition, in this specification, the system represents the entirety of an apparatus including a plurality of devices and processing units.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for selecting one or more switching candidate channels from a plurality of channels for a plurality of transmission sources that transmit programs, the information processing apparatus comprising:
    a channel list generating unit that performs primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, in which the pieces of specifying information include electronic program guide (EPG) information and video for each of the one or more channels;
    a display control unit that controls display of the channel list for a user such that the EPG information and video for each respective channel is displayable in a sub-screen area of a display device; and
    a final candidate channel selecting unit that performs, in a case in which the user performs a selecting operation for selecting a channel from the channel list whose display is controlled by the display control unit, determination of the selected channel as a final candidate channel when the selected channel is one of the one or more secondary candidate channels, and determination of a different secondary candidate channel included in the channel list as the final candidate channel when the selected channel is not one of the one or more secondary candidate channels,
    wherein:
        the channel list generating unit further generates a cursor for indicating the final candidate channel;
        after the selecting operation is performed by the user, when the selected channel is one of the one or more secondary candidate channels, the final candidate channel selecting unit determines, as a display position of the cursor, a position at a piece of specifying information of the selected channel is indicated, and, when the selected channel is not one of the one or more secondary candidate channels, the final candidate channel selecting unit determines, as the display position of the cursor, a position at which a piece of specifying information of a different secondary candidate channel included in the channel list is indicated; and
        by positioning the cursor generated by the channel list generating unit at the position of the cursor determined by the final candidate selecting unit on the channel list, the display control unit further controls display of the channel indicated by the cursor as the final candidate channel, and
    wherein:
        the selecting operation designates, as the selected channel, a channel specified by a piece of specifying information corresponding to a position of the cursor next above or below a present position of the cursor; and
        after the selecting operation is performed by the user, when the selected channel is one of the one or more secondary candidate channels, the final candidate channel selecting unit determines, as the display position of the cursor, the position of the cursor next above or below the present position of the cursor, and, when the selected channel is not one of the one or more secondary candidate channels, the final candidate channel selecting unit determines, as the display position of the cursor, the position at which a piece of specifying information of the different secondary candidate channel is indicated, the piece of specifying information being closest to the selected channel in an upward or downward direction on the channel list.

2. The information processing apparatus according to claim 1, wherein:
    the plurality of transmission sources further transmit commercial messages, respectively; and
    in the second criterion, each channel on which the commercial message is being transmitted is excluded from the one or more secondary candidate channels.

3. The information processing apparatus according to claim 1, further comprising a recommended program selecting unit that selects a recommended program to be recommended for the user from the plurality of programs, with the plurality of programs being respectively transmitted from the plurality of transmission sources or with the plurality of programs scheduled to be respectively transmitted from the plurality of transmission sources,
    wherein, in the first criterion, a channel for one transmission source for transmitting the recommended program selected by the recommended program selecting unit is included in the one or more primary candidate channels.

4. The information processing apparatus according to claim 1, further comprising a channel determining unit that, when the user performs a determining operation for switching a watching-listening channel for broadcast-program watching and listening by the user to the final candidate channel whose display is controlled by the display control unit, determines, as the watching-listening channel, the final candidate channel, which is indicated by a piece of specifying information indicated by the cursor at the time the determining operation is performed.

5. An information processing apparatus for selecting one or more switching candidate channels from a plurality of channels for a plurality of transmission sources that transmit programs, the information processing apparatus comprising:
  a channel list generating unit that performs primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, in which the pieces of specifying information include electronic program guide (EPG) information and video for each of the one or more channels;
  a display control unit that controls display of the channel list for a user such that the EPG information and video for each respective channel is displayable in a sub-screen area of a display device; and
  a final candidate channel selecting unit that performs, in a case in which the user performs a selecting operation for selecting a channel from the channel list whose display is controlled by the display control unit, determination of the selected channel as a final candidate channel when the selected channel is one of the one or more secondary candidate channels, and determination of a different secondary candidate channel included in the channel list as the final candidate channel when the selected channel is not one of the one or more secondary candidate channels,
  wherein:
    the channel list generating unit further generates a cursor for indicating the final candidate channel;
    after the selecting operation is performed by the user, when the selected channel is one of the one or more secondary candidate channels, the final candidate channel selecting unit determines, as a display position of the cursor, a position at a piece of specifying information of the selected channel is indicated, and, when the selected channel is not one of the one or more secondary candidate channels, the final candidate channel selecting unit determines, as the display position of the cursor, a position at which a piece of specifying information of a different secondary candidate channel included in the channel list is indicated; and
    by positioning the cursor generated by the channel list generating unit at the position of the cursor determined by the final candidate selecting unit on the channel list, the display control unit further controls display of the channel indicated by the cursor as the final candidate channel,
  the information processing apparatus further comprising:
    a channel determining unit that, when the user performs a determining operation for switching a watching-listening channel for broadcast-program watching and listening by the user to the final candidate channel whose display is controlled by the display control unit, determines, as the watching-listening channel, the final candidate channel, which is indicated by a piece of specifying information indicated by the cursor at the time the determining operation is performed; and
    a commercial message detecting unit that, for each of the plurality of channels, on which commercial messages are respectively transmitted from the plurality of transmission sources, detects whether or not the commercial message is being transmitted,
  wherein, when the user performs a start operation for starting the selecting operation in a state in which the channel for which the commercial message detecting unit detects that the commercial message is being transmitted is determined as the watching-listening channel, the display control unit controls starting of display of the channel list and the cursor for the user, and, after the start operation is performed, when no determining operation is performed and the commercial message detecting unit detects termination of transmission of the commercial message for the watching-listening channel at the time the start operation is performed, the display control unit controls termination of display of the channel list and the cursor for the user, and the channel determining unit determines again, as the watching-listening channel, a channel set as the watching-listening channel at the time the start operation is operated.

6. An information processing method for an information processing apparatus for selecting one or more switching candidate channels for broadcast-program watching and listening by a user from a plurality of channels for a plurality of transmission sources that transmit programs, the information processing method comprising:
  performing primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, in which the pieces of specifying information include electronic program guide (EPG) information and video for each of the one or more channels;
  controlling display of the channel list for the user such that the EPG information and video for each respective channel is displayable in a sub-screen area of a display device; and
  performing, in a case in which the user performs a selecting operation for selecting a channel from the channel list, determination of the selected channel as a final candidate channel when the selected channel is one of the one or more secondary candidate channels, and determination of a different secondary candidate channel included on the channel list as the final candidate channel when the selected channel is not one of the one or more secondary candidate channels, further comprising:

generating a cursor for indicating the final candidate channel;

after the selecting operation is performed by the user, when the selected channel is one of the one or more secondary candidate channels, determining, as a display position of the cursor, a position at a piece of specifying information of the selected channel is indicated, and, when the selected channel is not one of the one or more secondary candidate channels, determining, as the display position of the cursor, a position at which a piece of specifying information of a different secondary candidate channel included in the channel list is indicated; and positioning the generated cursor at the determined position of the cursor on the channel list and controlling display of the channel indicated by the cursor as the final candidate channel, wherein:

the selecting operation designates, as the selected channel, a channel specified by a piece of specifying information corresponding to a position of the cursor next above or below a present position of the cursor; and after the selecting operation is performed by the user, when the selected channel is one of the one or more secondary candidate channels, determining, as the display position of the cursor, the position of the cursor next above or below the present position of the cursor, and, when the selected channel is not one of the one or more secondary candidate channels, determining, as the display position of the cursor, the position at which a piece of specifying information of the different secondary candidate channel is indicated, the piece of specifying information being closest to the selected channel in an upward or downward direction on the channel list.

7. A non-transitory computer readable recording medium having stored thereon a program to be executed by a computer that controls processing for selecting one or more switching candidate channels for broadcast-program watching and listening by a user from a plurality of channels for a plurality of transmission sources that transmit programs, the program comprising:

performing primary selection, in accordance with a first criterion, of one or more channels as one or more primary candidate channels for the one or more switching candidate channels from the plurality of channels in a predetermined order, secondary selection, in accordance with a second criterion, of one or more channels as one or more secondary candidate channels from the one or more primary candidate channels, and generation of a channel list having pieces of specifying information arranged in the predetermined order, the pieces of specifying information specifying details transmitted on one or more channels including at least the one or more secondary candidate channels among the one or more primary candidate channels, in which the pieces of specifying information include electronic program guide (EPG) information and video for each of the one or more channels;

controlling display of the channel list for the user such that the EPG information and video for each respective channel is displayable in a sub-screen area of a display device; and performing, in a case in which the user performs a selecting operation for selecting a channel from the channel list, determination of the selected channel as a final candidate channel when the selected channel is one of the one or more secondary candidate channels, and determination of a different secondary candidate channel included on the channel list as the final candidate channel when the selected channel is not one of the one or more secondary candidate channels, further comprising:

generating a cursor for indicating the final candidate channel;

after the selecting operation is performed by the user, when the selected channel is one of the one or more secondary candidate channels, determining, as a display position of the cursor, a position at a piece of specifying information of the selected channel is indicated, and, when the selected channel is not one of the one or more secondary candidate channels, determining, as the display position of the cursor, a position at which a piece of specifying information of a different secondary candidate channel included in the channel list is indicated; and positioning the generated cursor at the determined position of the cursor on the channel list and controlling display of the channel indicated by the cursor as the final candidate channel, wherein:

the selecting operation designates, as the selected channel, a channel specified by a piece of specifying information corresponding to a position of the cursor next above or below a present position of the cursor; and after the selecting operation is performed by the user, when the selected channel is one of the one or more secondary candidate channels, determining, as the display position of the cursor, the position of the cursor next above or below the present position of the cursor, and, when the selected channel is not one of the one or more secondary candidate channels, determining, as the display position of the cursor, the position at which a piece of specifying information of the different secondary candidate channel is indicated, the piece of specifying information being closest to the selected channel in an upward or downward direction on the channel list.

* * * * *